United States Patent
Wohlfeil

(10) Patent No.: US 12,436,989 B2
(45) Date of Patent: Oct. 7, 2025

(54) FAST CLUSTERING OF LOG MESSAGES

(71) Applicant: Dynatrace LLC, Waltham, MA (US)

(72) Inventor: Esteban Pérez Wohlfeil, Linz (AT)

(73) Assignee: Dynatrace LLC, Boston, MA (US)

( * ) Notice: Subject to any disclaimer, the term of this patent is extended or adjusted under 35 U.S.C. 154(b) by 8 days.

(21) Appl. No.: 18/517,930

(22) Filed: Nov. 22, 2023

(65) Prior Publication Data

US 2024/0202227 A1 Jun. 20, 2024

Related U.S. Application Data

(60) Provisional application No. 63/433,160, filed on Dec. 16, 2022.

(51) Int. Cl.
*G06F 16/35* (2025.01)
*G06F 16/353* (2025.01)

(52) U.S. Cl.
CPC .................. *G06F 16/353* (2019.01)

(58) Field of Classification Search
USPC .......................................... 707/740
See application file for complete search history.

(56) References Cited

U.S. PATENT DOCUMENTS

| | | | | |
|---|---|---|---|---|
| 11,928,144 B2* | 3/2024 | Levy | .................. | G06F 17/17 |
| 2014/0344622 A1* | 11/2014 | Huang | ................. | G06F 11/0775 |
| | | | | 714/37 |
| 2018/0101607 A1* | 4/2018 | Yoon | ................... | G06F 11/3006 |
| 2018/0102938 A1* | 4/2018 | Yoon | ...................... | G06F 16/358 |
| 2018/0285432 A1* | 10/2018 | Das | ........................ | G06F 16/955 |
| 2021/0049191 A1* | 2/2021 | Masson | ................. | G06F 16/345 |

FOREIGN PATENT DOCUMENTS

WO  WO-2007014268 A2  2/2007

OTHER PUBLICATIONS

Bar-Yossef, Ziv, et al. "Approximating edit distance efficiently." 45th Annual IEEE Symposium on Foundations of Computer Science. IEEE, 2004.

Charikar, Moses, and Robert Krauthgamer. Embedding the Ulam metric into ? 1. Theory of Computing 2.1 (2006): 207-224.

(Continued)

*Primary Examiner* — Belix M Ortiz Ditren
(74) *Attorney, Agent, or Firm* — Harness, Dickey & Pierce, P.L.C.

(57) ABSTRACT

A computer-implemented technique is presented for analyzing log messages. The method includes: receiving a plurality of log message from a list of log messages; for each log message in the log messages, generating a fingerprint for the log message and appending the fingerprint to the log message, where the fingerprint is comprised of punctuation characters in the log message; sorting the log messages in the list of log messages according to the punctuation characters comprising a fingerprint for a given log message; and clustering log messages in the sorted list of log messages into a final set of clusters, where each cluster in the final set of clusters includes one or more log messages and the log messages in each cluster have fingerprints similar to other log messages in the cluster.

22 Claims, 7 Drawing Sheets

(56) References Cited

OTHER PUBLICATIONS

Figure 1:
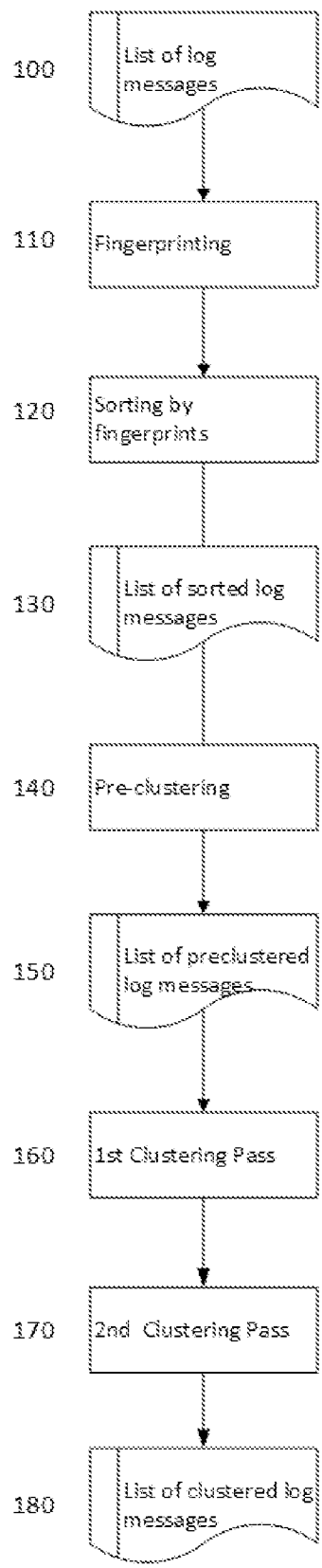

Andoni, Alexandr, Robert Krauthgamer, and Krzysztof Onak. "Polylogarithmic approximation for edit distance and the asymmetric query complexity." 2010 IEEE 51st Annual Symposium on Foundations of Computer Science. IEEE, 2010.
Pinjia He et al. Drain: An Online Log Parsing Approach with Fixed Depth Tree, 2017 IEEE 24th International Conference on Web Services, DOI 10.1109/ICWS.2017.13, pp. 33-40.
A. Clifford: "Hashtag Tutorial: Section 2.4—Hash Functions for Strings." Aug. 24, 2011, pp. 13.

* cited by examiner

FAST CLUSTERING OF LOG MESSAGES

CROSS-REFERENCE TO RELATED APPLICATIONS

This application claims the benefit of U.S. Provisional Application No. 63/433,160, filed on Dec. 16, 2022. The entire disclosure of the above application is incorporated herein by reference.

FIELD

The disclosure concerns the technical field of information technology and more specifically the field of application performance monitoring and observability of computers, preferably of a system of computers in connection with a cloud infrastructure. In particular, the disclosure concerns a computer implemented method for fast, autonomous clustering of large scale and highly unstructured log messages.

BACKGROUND

Operating systems for clients and servers, applications (both locally installed, web based and hybrid), networks including the cloud, and containers (such as Docker or Kubernetes) generate during operation so-called log messages. A log message is a string, which is typically contained individually (say as one line) in a file or list of log messages. Each log message usually contains a time stamp and a message portion; additionally, other information, such as the severity level, the source, payload . . . can be included. The message portion can relate to an application or system related event, a security event, or a setup event, etc. Log messages contain important information for the observability and the application performance monitoring of applications and/or computers. Since many heterogenous log messages exist, the clustering of log messages into clusters of "similar" log messages is difficult. Furthermore, as computers typically operate in large clusters and for example, potentially any computer can be targeted in order to get access/compromise a network and/or data, large volumes of log messages are generated as a result. Finally, as e.g. an attack is sometimes not detected in real time but later, log files need to be stored for a certain period of time, which increases the volume of the log messages further.

Multiple methods for calculating the similarity between strings are known in the art. The edit distance, which originally is based on the Levenshtein distance, identifies the minimum number of operations (in particular additions, deletions or substitutions of single characters) in order to transform one string into another. Although the Levenshtein distance is optimal in the sense that it comes up with the absolute minimum number of such operations, it is computationally expensive due to its quadratic complexity $\Omega(n^2)$ and due to the pairwise comparison. Thus, the Levenshtein distance on its own is unsuitable for either long log messages and/or for large scale collections of log messages. The edit distance may also be evaluated by other similarity distances, such as the Jaro-Winkler distance, the Damerau-Levenshtein distance or the Ratcliff-Obershelp distance, among others. Although the Jaro-Winkler distance is more computationally efficient than the Levenshtein distance, the latter two distances also suffer from at least strict quadratic complexity. In addition, although these distances or metrics may be well suited for some types of strings, they may be less suitable for other types of strings. In addition to the distances mentioned above, approximations for the Levenshtein distance are known in the art, for example:

Bar-Yossef, Ziv, et al. "Approximating edit distance efficiently." 45th Annual IEEE Symposium on Foundations of Computer Science. IEEE, 2004;

Charikar, Moses, and Robert Krauthgamer. "Embedding the Ulam metric into l1." Theory of Computing 2.1 (2006): 207-224;

Andoni, Alexandr, Robert Krauthgamer, and Krzysztof Onak. "Polylogarithmic approximation for edit distance and the asymmetric query complexity." 2010 IEEE 51st Annual Symposium on Foundations of Computer Science. IEEE, 2010.

These and possible other approximations known in the literature can render the computation of the edit distance computationally more efficient under special assumptions. However, both the efficiency and the accuracy of the approximation need to be considered.

This section provides background information related to the present disclosure which is not necessarily prior art.

SUMMARY

This section provides a general summary of the disclosure, and is not a comprehensive disclosure of its full scope or all of its features.

The goal of the disclosure is to come up with a computer implemented method that is suitable to quickly cluster large amounts of highly unstructured log messages in a fully autonomous manner. Highly unstructured means that the log messages may come from different sources and no, or at least very little, a priori domain knowledge about the structure and contents of the log messages is known or present. Quickly means that typically some hundreds of thousands of log messages can be processed by a single core computer per second and that the method shows essentially linear complexity. In addition, the resulting clusters of the computer implemented method shall be explainable, meaning that the results have an easy-to-spot similarity. In other words, "black box" behavior shall be avoided. Finally, the similarity check shall remain in the character space as opposed to other approaches making use of the frequency domain, hashing, embeddings, or other techniques which "obfuscate" the reasons why logs were added to a cluster of similar logs.

One aspect of the disclosure concerns a computer implemented method for clustering log messages, in particular log messages from an operating system, an application running on one or more computers, a container and/or a network, wherein the log messages are contained individually in a list of log messages, the method comprising the following steps:

1) for each log message in the list of log messages: adding a fingerprint to the log message by using punctuation characters from the log message, wherein the punctuation characters form the fingerprint of the log message;

2) transforming the list of log messages into a first list of sorted log messages by lexicographically sorting the fingerprints of the log messages taking into account all characters of the fingerprints of the log messages;

3) pre-clustering of the first list of sorted log messages into a first list of pre-clustered log messages, wherein log messages having identical fingerprints form a cluster;

4) clustering of the first list of pre-clustered log messages into a first list of clustered log messages, wherein for all clusters in the first list of pre-clustered log messages, a log message located in one of the subsequent clusters is added to the cluster if the normalized edit distance NED of a first fingerprint F1 of the log message in the cluster and a second fingerprint F2 of the log message in one of the subsequent clusters is less or equal to a similarity threshold simThresh, wherein the normalized edit distance NED is defined as the edit distance ED of the first and second fingerprints F1, F2 divided by the maximum length of the first and second fingerprints $$NED(F1, F2) = \frac{ED(F1, F2)}{\max[\text{length}(F1), \text{length}(F2)]}.$$

From a mathematician's point of view it should be noted that the definition for the normalized edit distance is not a metric distance, but rather a measure of similarity/dissimilarity between two strings.

In a first step, fingerprints for all log messages are created. The fingerprints take into account at least the so-called punctuation characters of the log messages, which are indicative for the structure of the log message. The fingerprint is considerably shorter than the log message itself. The generation of fingerprints, short fingerprinting, can be done by cores of a multi-core processor or CPU, multiple processors or even multiple computer systems in a parallel manner. The log messages can be split into multiple segments and a single core/single processor can operate on an individual segment of the log messages. In this manner, the total time to generate the fingerprints and subsequently cluster large amounts of log messages is greatly reduced.

In a second step, the log messages are sorted lexicographically considering all characters of the fingerprints.

In a third step, log messages having identical fingerprints are pre-clustered into the same cluster.

In a fourth step, it is checked whether the fingerprint of a log message in a subsequent cluster is similar to the fingerprint of a log message in the cluster. This is done using the normalized edit distance NED, which is the edit distance of the two fingerprints divided by the maximum length of the fingerprints. Multiple methods are known how to compute the edit distance between strings. Instead of computing the edit distance accurately, approximations for the edit distance can be utilized too. The normalized edit distance ensures that not just the edit distance but also the length of the fingerprints is considered to determine the similarity between two fingerprints. If the NED of two fingerprints is smaller or equal to a similarity threshold sim Thresh, then those two fingerprints and also the two log messages are considered similar. Although the similarity threshold simThresh is freely adjustable, it typically is between 5% and 35%, preferably between 15% and 30%. Note that both the exact evaluation of the edit distance by utilizing the Levenshtein distance and the evaluation of approximations for the edit distance shall be covered by this disclosure.

In comparison with the state of the art tool DRAIN (see Pinjia He et al. Drain: An Online Log Parsing Approach with Fixed Depth Tree, 2017 IEEE 24$^{th}$ International Conference on Web Services, DOI 10.1109/ICWS.2017.13, pp. 33-40), the performance of the presented method on a highly unstructured dataset of some 5 Million log messages from multiple sources is some 3× faster than DRAIN and 8× fewer clusters were found, meaning log messages were more densely grouped while still reporting high similarity.

The disclosure allows not just the clustering of huge amounts of log messages at significant lower CPU load, but also allows that the analysis of performance issues, security incidents, communication problems or container issues can be done a lot quicker (if not in real time) and computationally more efficient. Being able to detect problems/issues quicker, allows automatic remediation of issues before they have a significant impact on the cluster of computers. Therefore, the reliability and overall performance of computer/clusters of computers is increased. By reducing the CPU load significantly, the power consumption of data warehouses is cut too, which is benefiting the environment.

By allowing the efficient clustering of huge amounts of logs, the disclosure among others facilitates (1) fast summarization and exploration of the state of the system, (2) the analysis of performance issues and the profiling of the system, (3) template mining or extraction of patterns, (4) root cause analyses and correlation of anomalies, (5) a finer-grain real-time alerting, etc.

According to an embodiment of the disclosure, the edit distance of the first and second fingerprints is the Levenshtein distance between the first and second fingerprints or an approximation of the Levenshtein distance between the first and second fingerprints.

According to another embodiment of the disclosure, the similarity threshold simThresh is between 5% and 35%, preferably between 15% and 30%.

When clustering the first list of pre-clustered log messages into a first list of clustered log messages, typically 3 (NC=3) subsequent clusters are considered.

In a preferred embodiment of the disclosure, before the step of clustering of the first list of pre-clustered log messages into a first list of clustered log messages, identical leading portions of the first fingerprint of the log message in the cluster and the second fingerprint of the log message in the subsequent cluster are removed AND/OR identical trailing portions of the first fingerprint of the log message in the cluster and the second fingerprint of the log message in the subsequent cluster are removed. By this, the calculation of the edit distance becomes more computationally efficient due to the reduced length of the strings.

After having removed identical portions of the first and second fingerprints, it is beneficial to define the normalized edit distance NED as the edit distance ED of the shortened first fingerprint F1* and the shortened second fingerprint F2* (i.e. after removal of common leading and/or trailing portions) divided by the maximum length of the first and second fingerprints before shortening $$NED(F1^*, F2^*) = \frac{ED(F1^*, F2^*)}{\max[\text{length}(F1), \text{length}(F2)]}.$$

In many cases it is beneficial to perform the following step after step 4:

5) clustering of the first list of clustered log messages into a second list of clustered log messages, wherein for all clusters in the first list of clustered log messages, a log message located in a subsequent cluster is added to the cluster if the normalized edit distance NED of the fingerprint of the log message in the cluster and the fingerprint of the log message in the subsequent cluster is less or equal to a similarity threshold, wherein the normalized edit distance NED is defined as the edit distance of the first and second fingerprints divided by the maximum length of the first and second fingerprints. By this additional clustering step, the number of clusters is further reduced.

In case of the additional clustering step 5, it is beneficial to consider more than three, preferably four, five or six subsequent clusters.

In certain cases, it is advantageous to perform the following step after one of the preceding steps:

transforming a first list of clustered log messages into a second list of clustered log messages by lexicographically sorting the fingerprints of the first list of clustered log messages taking into account all even characters of the fingerprints of the log messages;

pre-clustering of the second list of clustered log messages into a third list of clustered log messages, wherein log messages having identical fingerprints form a cluster;

clustering of the third list of clustered log messages into a fourth list of clustered log messages, wherein for all clusters in the third list of clustered log messages, a log message located in a subsequent cluster is added to the cluster if the normalized edit distance NED of the fingerprint of the log message in the cluster and the fingerprint of the log message in the subsequent cluster is less or equal to a similarity threshold, wherein the normalized edit distance NED is defined as the edit distance of the first and second fingerprints divided by the maximum length of the first and second fingerprints.

In other cases, it is advantageous to perform the following step after one of the preceding steps:

transforming a list of clustered log messages into a second list of clustered log messages by lexicographically sorting the fingerprints of the first list of clustered log messages taking into account all odd characters of the fingerprints of the log messages;

pre-clustering of the second list of clustered log messages into a third list of clustered log messages, wherein log messages having identical fingerprints form a cluster;

clustering of the third list of clustered log messages into a fourth list of clustered log messages, wherein for all clusters in the third list of clustered log messages, a log message located in a subsequent cluster is added to the cluster if the normalized edit distance NED of the fingerprint of the log message in the cluster and the fingerprint of the log message in the subsequent cluster is less or equal to a similarity threshold, wherein the normalized edit distance NED is defined as the edit distance of the first and second fingerprints divided by the maximum length of the first and second fingerprints.

By transforming a list of clustered log messages into a second list of clustered log messages by lexicographically sorting the fingerprints of the first list of clustered log messages taking into account either all odd or all even characters of the fingerprints of the log messages, it is possible to cluster closely related fingerprints that because of single insertions or deletions are too far away position-wise to be clustered by "normal" sorting, i.e. considering all characters.

Within the 7-bit ASCII space, punctuation characters are not comprised in ASCII codes 32, 48 to 57, 65 to 90, 97 to 122, and 128-255 of the log message. Characters outside the 7-bit ASCII space, e.g. ASCII codes 128-255 (sometimes referred to as Unicode or extended ASCII characters), are typically not regarded as punctuation characters either.

In addition or instead of considering punctuation characters for the fingerprint, the disclosure allows to extract sentences from the log message, wherein if the log message contains at least one sentence, i.e. a first word comprising more than one text character from ASCII codes 65 to 90 and/or 97-122 and not comprising any other non-text characters, immediately followed by a second word comprising more than one text character from ASCII codes 65 to 90 and/or 97-122 and not comprising any other non-text characters, between two punctuation characters, the first N characters of the words are also added to the fingerprint of the log message.

In addition or instead of considering punctuation characters for the fingerprint, the disclosure allows to extract keywords from the log message, wherein if the log message contains at least one word contained in a list of keywords, such as "error", "info", "debug", . . . , the first N characters of the word are added to the fingerprint of the log message.

When adding either sentences or keywords to the fingerprint of a log message, it is beneficial to set N>1, more specifically that N is 2, 3, 4 or 5.

Further areas of applicability will become apparent from the description provided herein. The description and specific examples in this summary are intended for purposes of illustration only and are not intended to limit the scope of the present disclosure.

DRAWINGS

Figure 2:
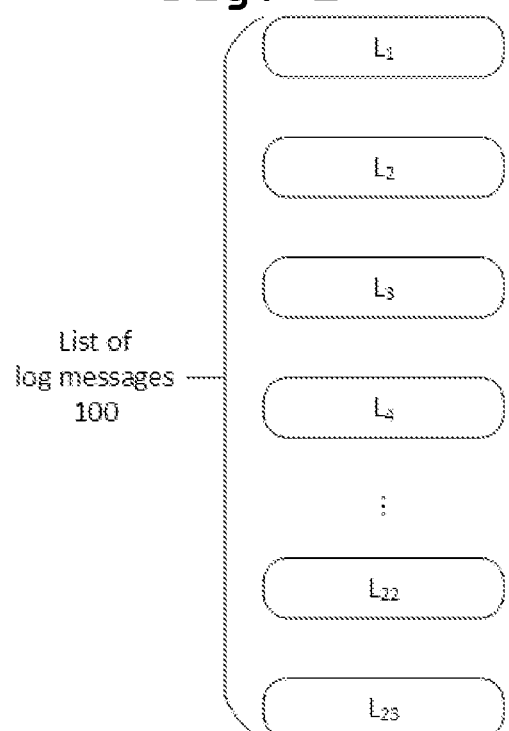
Figure 3:
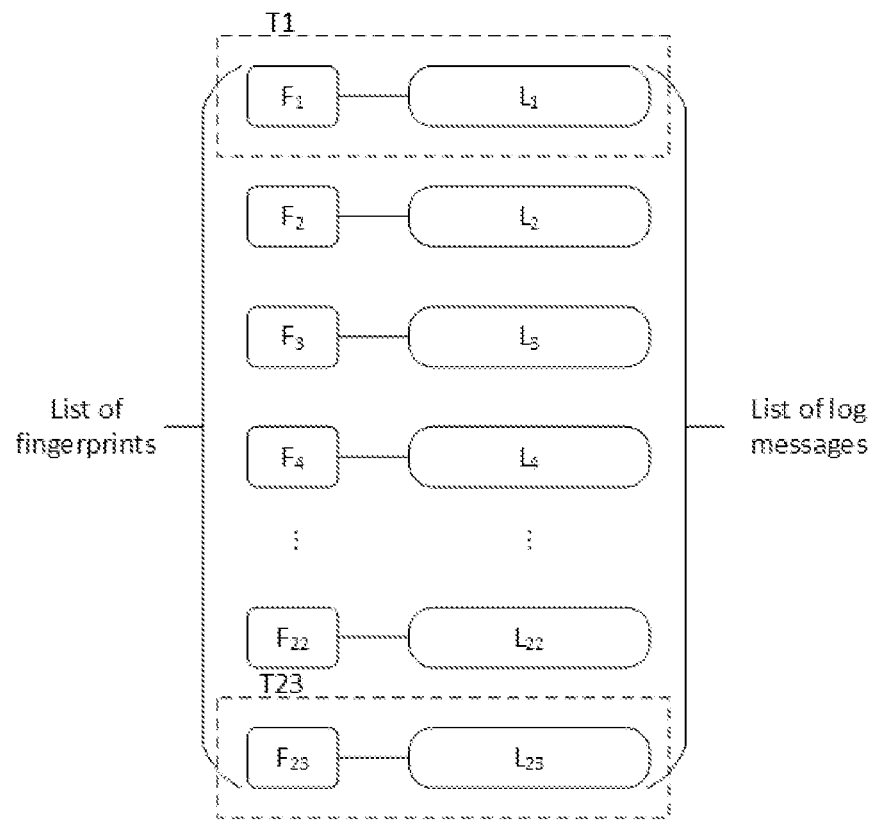
Figure 4:
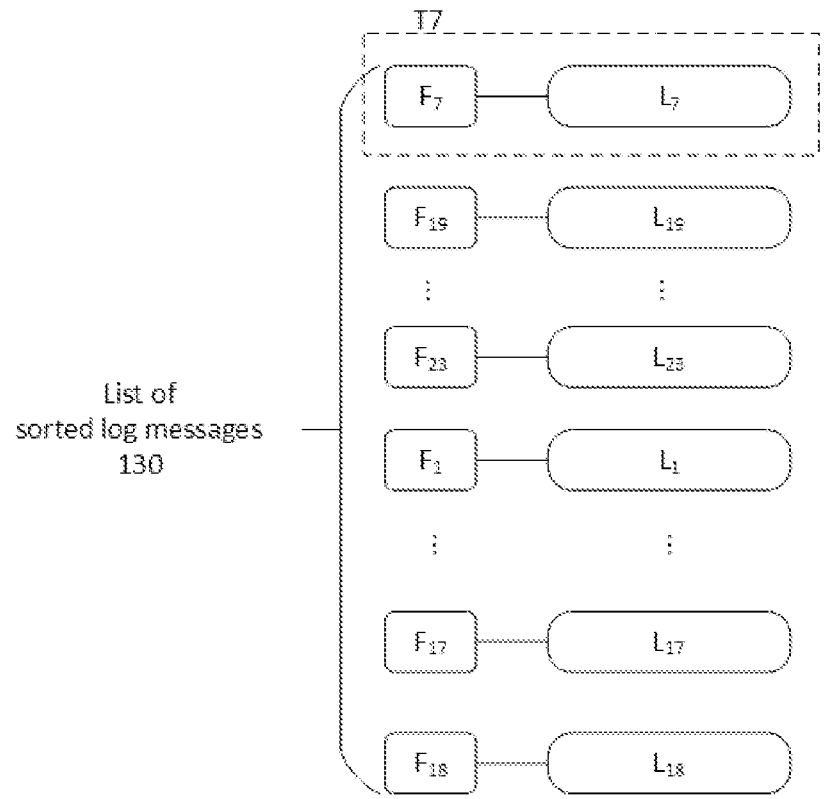
Figure 5:
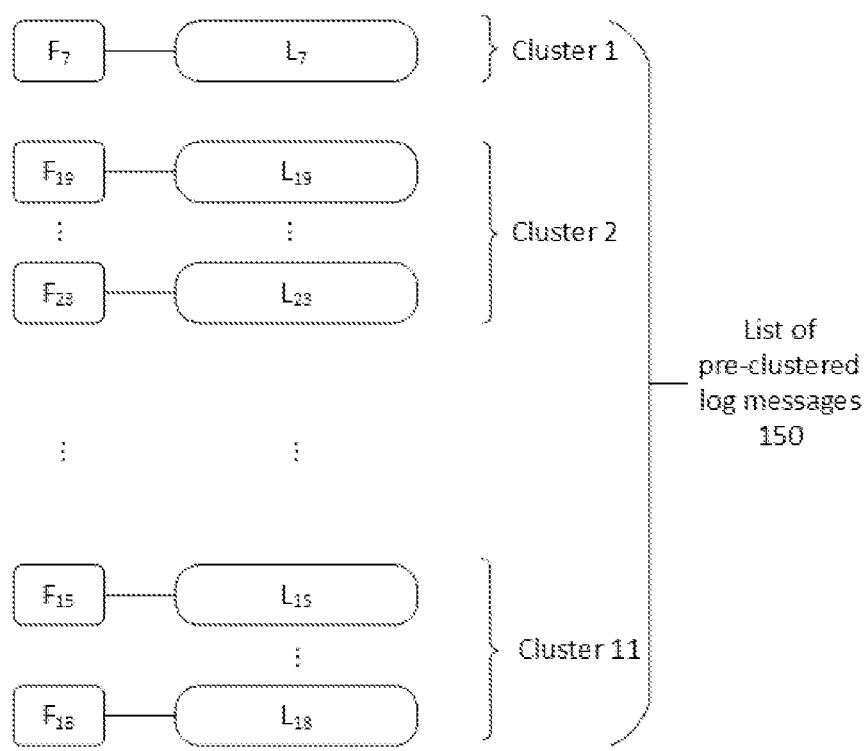
Figure 6:
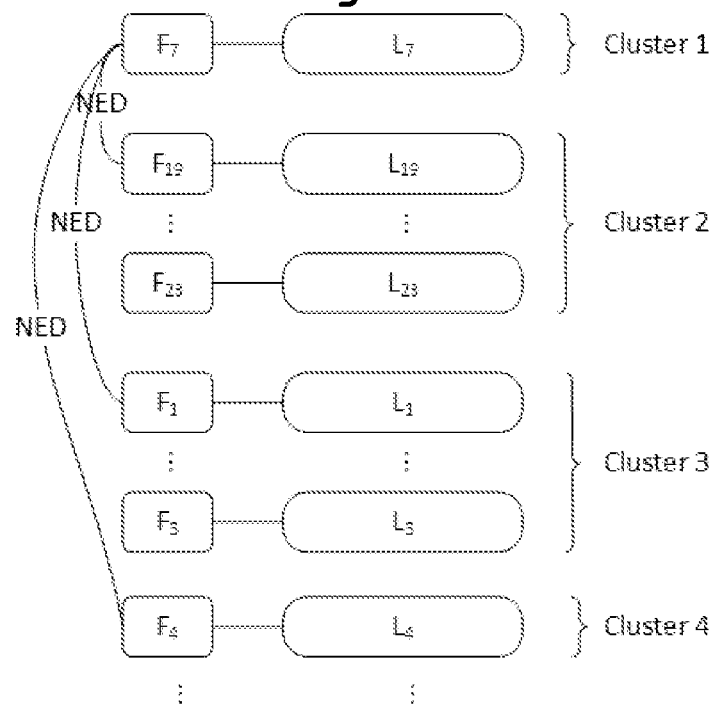
Figure 8:
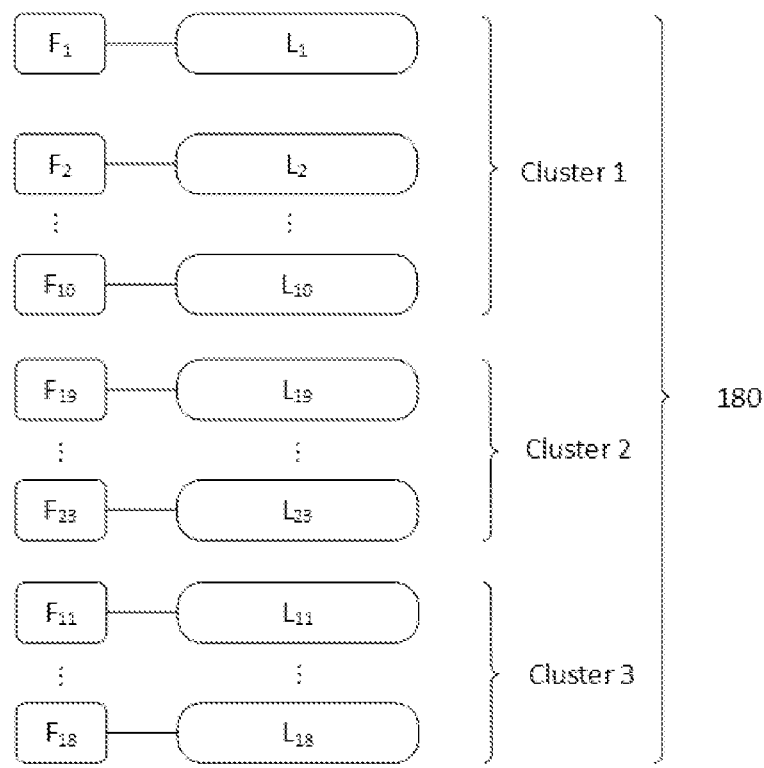
Figure 7:
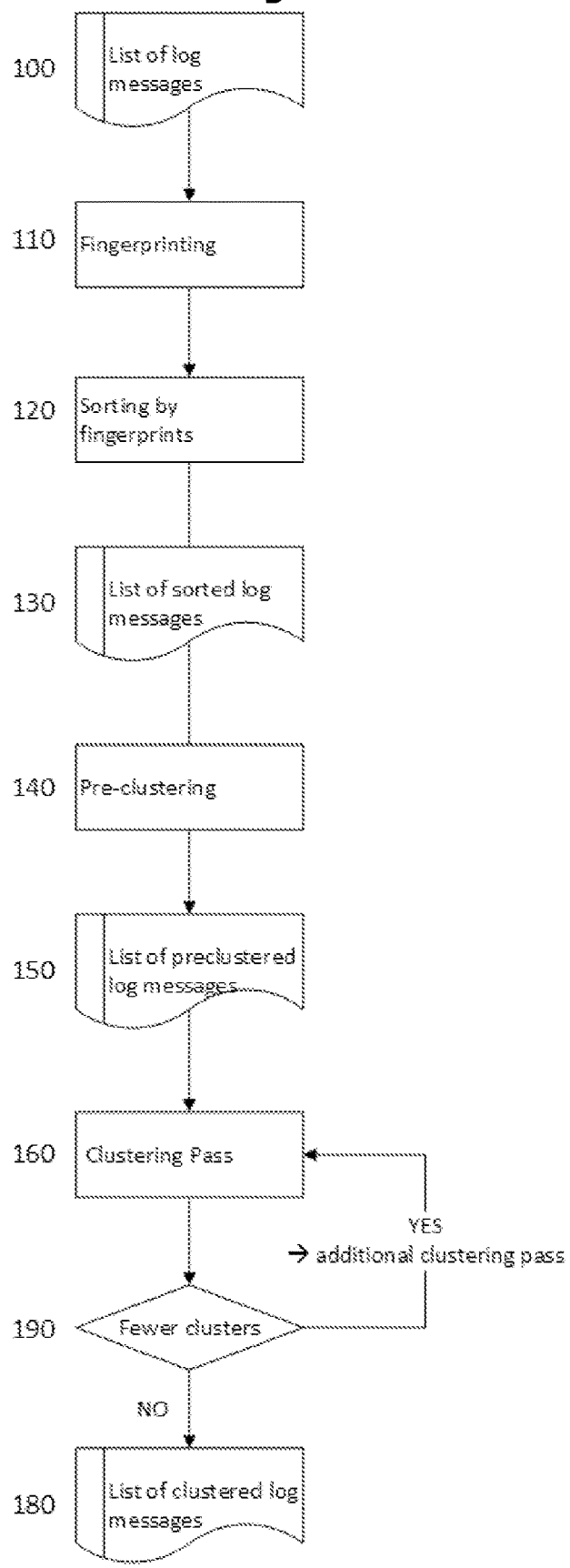
Figure 9:
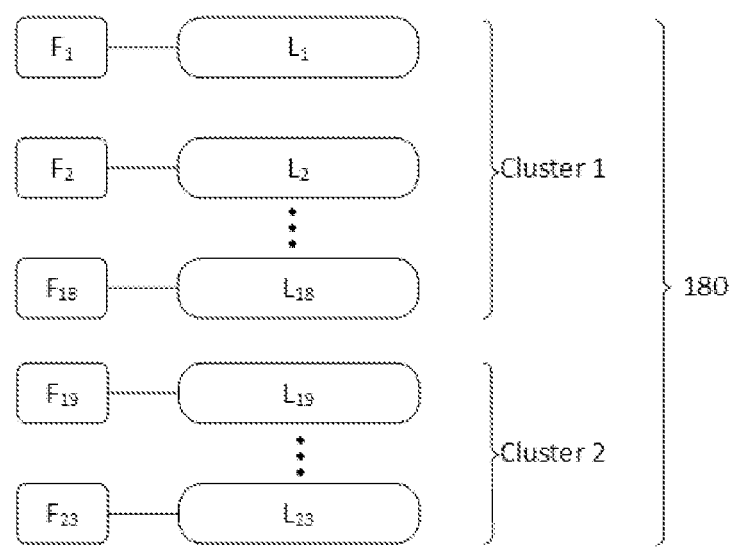
Figure 10:
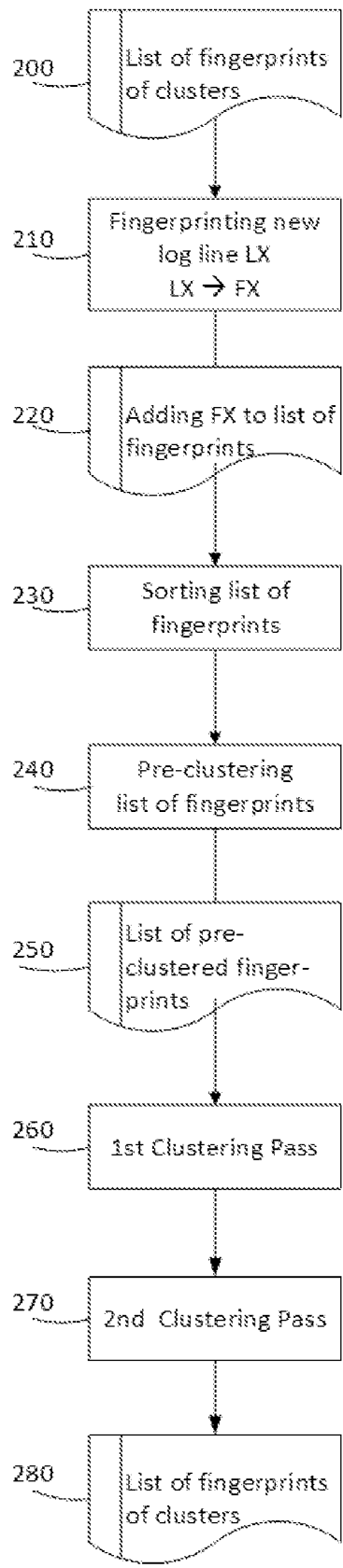

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 provides an overview of a technique for analyzing log messages in accordance with this disclosure, FIG. 2 shows a list of log messages 100, FIG. 3 shows some of the doubles of fingerprints and log messages T1-T23, FIG. 4 shows a list of sorted log messages 130, FIG. 5 shows a list of pre-clustered log messages 140, FIG. 6 shows some steps done during the clustering of the list of pre-clustered log messages 140 into a list a clustered log messages 180, FIG. 7 shows a second schematic indicating the main steps involved in the disclosure, including a stopping condition 190, FIG. 8 shows the list of clustered log messages at the end of the 1$^{st}$ application example, FIG. 9 shows the list of clustered log messages at the end of the 3$^{rd}$ application example, and FIG. 10 shows an overview of the steps when adding a new log line to a list of clustered log messages.

Corresponding reference numerals indicate corresponding parts throughout the several views of the drawings.

DETAILED DESCRIPTION

Example embodiments will now be described more fully with reference to the accompanying drawings.

FIG. 1 provides an overview of a technique for analyzing log messages. A list of log messages serves as a starting point as indicated at 100. For each log in the list of log messages, a fingerprint for a given log message is generated and the fingerprint is appended to the given log message at 110. Although not limited thereto, the fingerprint is appended as a prefix to the front the log message. In one example, the fingerprint is comprised of punctuation characters in the log message.

The log messages in the list of log messages are then sorted at 120 according to the punctuation characters comprising a fingerprint for a given log message, thereby forming a sorted list of log messages 130. The sorted list of log messages can in turn be clustered into a final set of clusters, where each cluster in the final set of clusters includes one or more log messages and the log messages in each cluster have fingerprints similar to other log messages in the cluster.

Log messages in the sorted list of log messages can be clustered in one or more passes, or in an iterative manner as further described below. In one example, log messages in the sorted list of log messages are first clustered into a first set of clusters as indicated at 140, where log messages in each cluster of the first set of clusters has identical fingerprints.

Log messages in the first set of clusters 150 are then further clustered at 160 to form the final set of clusters. In the second pass, the log messages in the first set of clusters are clustered by computing a similarity metric between a fingerprint from a given cluster of the first set of clusters and a fingerprint from each of one or more subsequent clusters in the first set of clusters, and combining log messages from a particular cluster in the one or more subsequent clusters into the given cluster when the similarity metric for the particular cluster is less than a similarity threshold. For each uncombined cluster in the first set of clusters, these steps are repeated, thereby forming a second set of clusters. After the second pass, clustering may be completed, thereby yielding the final set of clusters. Alternatively, clustering may continue as indicated at 170 until a stop condition is met.

In this example, the similarity metric is further defined as an edit distance (e.g., Levenshtein distance). In some instances, the value for the similarity metric are normalized. For example, a normalized edit distance is computed as an edit distance between a first and second fingerprint divided by a length of a fingerprint, where the length corresponds to the longer of either the first fingerprint or the second fingerprint.

For illustration purposes, an example embodiment will be described in more detail using the following example log messages (L1 to L23):

TABLE 1

| | Log lines L1-L23 |
|---|---|
| L1 | [07.26 14:14:18] chrome.exe *64 - f-log-extension.grammarly.io:443 close, 849 bytes sent, 3626 bytes (3.54 KB) received, lifetime 01:01 |
| L2 | [07.26 15:25:19] chrome.exe *64 - zhihu-web-analytics.zhihu.com:443 close, 343 bytes sent, 3122 bytes (3.04 KB) received, lifetime 00:11 |
| L3 | [07.26 15:25:19] chrome.exe *64 - zhihu-web-analytics.zhihu.com:443 close, 343 bytes sent, 3122 bytes (3.04 KB) received, lifetime 00:11 |
| L4 | [07.26 16:27:39] chrome.exe *64 - hkg3-2.fbcdn.net:443 close, 339 bytes sent, 3826 bytes (3.73 KB) received, lifetime 00:21 |
| L5 | [07.26 15:29:26] chrome.exe *64 - user.images.githubusercontent.com:443 close, 335 bytes sent, 4369 bytes (4.26 KB) received, lifetime 03:15 |
| L6 | [07.26 15:29:27] chrome.exe *64 - user.images.githubusercontent.com:443 close, 335 bytes sent, 4369 bytes (4.26 KB) received, lifetime 03:15 |
| L7 | [07.26 15:29:27] chrome-remote *64 *32 *128 - user.images-remote.github.user.content.com:443 close, 335 bytes sent, 4369 bytes (4.26 KB) rec |
| L8 | [07.26 15:29:31] chrome.exe *64 - 12.client.google.com:443 close, 474 bytes sent, 4042 bytes (3.94 KB) received, lifetime <1 sec |
| L9 | [07.26 15:29:27] chrome.exe *64 - github.usercontent.com:443 close, 335 bytes sent, 4369 bytes (4.26 KB) received, lifetime 03:15 |

TABLE 1-continued

| | Log lines L1-L23 |
|---|---|
| L10 | [07.26 15:29:28] chrome.exe - remote-user.content.com:443 close, 335 bytes sent, 4369 bytes (4.26 KB) received, lifetime 03:15 |
| L11 | [07.26 15:29:28] chrome.exe - 15.user-remote.content.com:443 close, 335 bytes sent, 4369 bytes (426 KB) received, lifetime <1 sec |
| L12 | [07.26 15:29:28] chrome.exe - client.github.user.content.com:443 close, 335 bytes sent, 4369 bytes (426 KB) received, lifetime 03:15 |
| L13 | [07.26 15:29:28] chrome.exe - client.github.user.content.com:443 close, 335 bytes sent, 4369 bytes (426 KB) received, lifetime 03:15 |
| L14 | [07.26 15:29:28] chrome.exe - client.github.user.content.com:443 close, 335 bytes sent, 4369 bytes (426 KB) received, lifetime 03:15 |
| L15 | [07.26 15:29:28] chrome.exe - client.github.user.content.com:443 close, 335 bytes sent, 4369 bytes (3.93 KB) received, lifetime 03:15 |
| L16 | [07.26 15:29:28] chrome.exe - client.github.user.content.com:443 close, 335 bytes sent, 4369 bytes (3.93 KB) received, lifetime 03:15 |
| L17 | [07.26 15:29:28] chrome.exe - client.github.user.content.com:443 close, 335 bytes sent, 4369 bytes (3.93 KB) received, lifetime 03:15 |
| L18 | [07.26 15:29:28] chrome.exe - client.github.user.content.com:443 close, 335 bytes sent, 4369 bytes (3.93 KB) received, lifetime 03:15 |
| L19 | [10.30 18:04:14] Skype-remote.exe - 86.99.222.235:443 error : Could not connect through proxy proxy.cse.cuhk.edu.hk:5070 |
| L20 | [10.30 18:04:15] Skype-remote.exe - 86.99.222.235:443 error : Could not connect through proxy proxy.cse.cuhk.edu.hk:5070 |
| L21 | [10.30 18:04:15] Skype-remote.exe - 86.99.222.235:443 error : Could not connect through proxy proxy.cse.cuhk.edu.hk:5070 |
| L22 | [10.30 18:04:16] Skype-remote.exe - 86.99.222.235:443 error : Could not connect through proxy proxy.cse.cuhk.edu.hk:5070 |
| L23 | [10.30 18:04:16] Skype-remote.exe - 86.99.222.235:443 error : Could not connect through proxy proxy.cse.cuhk.edu.hk:5070 |

With continued reference to FIG. 1, log messages L1-L23 are contained in a list of log messages 100 (see also FIG. 2).

In a first step, fingerprints are formed (short fingerprinting 110) for all log messages. In order to do so, the punctuation characters of a log message not belonging to either number 0-9 (ASCII 48-57), small characters a-z (ASCII 97-122), capital characters A-Z (ASCII 65-90) or the space character (ASCII 32) are extracted from a respective log message. It is to be understood that punctuation characters may differ in other encodings, such as UTF-8. These so-called punctuation characters from the log messages form the fingerprints of the log messages. The fingerprints are much shorter than the log messages and these will be used for the subsequent steps.

The fingerprint of the first line L1 of the list of log messages becomes F1="[.::].*---..:,(.),:", see visual demonstration below:

| | [07.26 14:14:18] chrome.exe *64 - f-log-extension.grammarly.io:443 close, 849 bytes sent, 3626 bytes |
|---|---|
| L1 | (3.54 KB) received, lifetime 01:01 |
| | [~~07.26 14:14:18~~] ~~chrome.exe *64 - f-log-~~ |
| | ~~extension.grammarly.io:443 close, 849 bytes sent, 3626 bytes~~ |
| | ~~(3.54 KB) received, lifetime 01:01~~ |
| F1 | [.::].*---..:,(.),: |

Consequently, the fingerprints F1 to F23 for lines L1 to L23 of the log messages are:

TABLE 2

Fingerprints F1-F23 for log lines L1-L23

| | |
|---|---|
| F1  | [.::].*---..:,,(.), |
| F2  | [.::].*---..:,,(.), |
| F3  | [.::].*---..:,,(.), |
| F4  | [.::].*--..:,,(.),: |
| F5  | [.::].*-...:,,(.),: |
| F6  | [.::].*-...:,,(.),: |
| F7  | [.::]-***-.-....:,,(.),: |
| F8  | [.::].*-...:,,(.),< |
| F9  | [.::].*-..:,,(.),: |
| F10 | [.::].--..:,,(.),: |
| F11 | [.::].-.-..:,,( ),< |
| F12 | [.::].-....:,,( ),: |
| F13 | [.::].-....:,,( ),: |
| F14 | [.::].-....:,,( ),: |
| F15 | [.::].-....:,,(.),: |
| F16 | [.::].-....:,,(.),: |
| F17 | [.::].-....:,,(.),: |
| F18 | [.::].-....:,,(.),: |
| F19 | [.::]-.-...::....: |
| F20 | [.::]-.-...::....: |
| F21 | [.::]-.-...::....: |
| F22 | [.::]-.-...::....: |
| F23 | [.::]-.-...::....: |

The fingerprints are added to the log messages (see FIG. 3), e.g. by denoting the log message and its corresponding fingerprint as a "couple" or "double", i.e. a tuple of length 2, whereas the first field of a couple represents the fingerprint and the second field of the couple the respective log message itself (see tuples T1-T23 below):

| | |
|---|---|
| T1  | [.::].*---..:,,(.),:<br>[07.26 14:14:18] chrome.exe *64 - f-log-extension.grammarly.io:443 close, 849 bytes sent, 3626 bytes (3.54 KB) received, lifetime 01:01 |
| T2  | [.::].*---..:,,(.),:<br>[07.26 15:25:19] chrome.exe *64 - zhihu-web-analytics.zhihu.com:443 close, 343 bytes sent, 3122 bytes (3.04 KB) received, lifetime 00:11 |
| T3  | [.::].*---..:,,(.),:<br>[07.26 15:25:19] chrome.exe *64 - zhihu-web-analytics.zhihu.com:443 close, 343 bytes sent, 3122 bytes (3.04 KB) received, lifetime 00:11 |
| T4  | [.::].*--..:,,(.),:<br>[07.26 16:27:39] chrome.exe *64 - hkg3-2.fbcdn.net:443 close, 339 bytes sent, 3826 bytes (3.73 KB) received, lifetime 00:21 |
| T5  | [.::].*-...:,,(.),:<br>[07.26 15:29:26] chrome.exe *64 - user.images.githubusercontent.com:443 close, 335 bytes sent, 4369 bytes (4.26 KB) received, lifetime 03:15 |
| T6  | [.::].*-...:,,(.),:<br>[07.26 15:29:27] chrome.exe *64 - user.images.githubusercontent.com:443 close, 335 bytes sent, 4369 bytes (4.26 KB) received, lifetime 03:15 |
| T7  | [.::]-***-.-....:,,(.),:<br>[07.26 15:29:27] chrome-remote *64 *32 *128 - user.images-remote.github.user.content.com:443 close, 335 bytes sent, 4369 bytes (4.26 KB) rec |
| T8  | [.::].*-...:,,(.),<<br>[07.26 15:29:31] chrome.exe *64 - 12.client.google.com:443 close, 474 bytes sent, 4042 bytes (3.94 KB) received, lifetime <1 sec |
| T9  | [.::].*-..:,,(.),:<br>[07.26 15:29:27] chrome.exe *64 - github.usercontent.com:443 close, 335 bytes sent, 4369 bytes (4.26 KB) received, lifetime 03:15 |
| T10 | [.::].--..:,,(.),:<br>[07.26 15:29:28] chrome.exe - remote-user.content.com:443 close, 335 bytes sent, 4369 bytes (4.26 KB) received, lifetime 03:15 |
| T11 | [.::].-.-..:,,( ),<<br>[07.26 15:29:28] chrome.exe - 15.user-remote.content.com:443 close, 335 bytes sent, 4369 bytes (426 KB) received, lifetime <1 sec |
| T12 | [.::].-....:,,( ),:<br>[07.26 15:29:28] chrome.exe - client.github.user.content.com:443 close, 335 bytes sent, 4369 bytes (426 KB) received, lifetime 03:15 |
| T13 | [.::].-....:,,( ),:<br>[07.26 15:29:28] chrome.exe - client.github.user.content.com:443 close, 335 bytes sent, 4369 bytes (426 KB) received, lifetime 03:15 |
| T14 | [.::].-....:,,( ),:<br>[07.26 15:29:28] chrome.exe - client.github.user.content.com:443 close, 335 bytes sent, 4369 bytes (426 KB) received, lifetime 03:15 |
| T15 | [.::].-....:,,(.),:<br>[07.26 15:29:28] chrome.exe - client.github.user.content.com:443 close, 335 bytes sent, 4369 bytes (3.93 KB) received, lifetime 03:15 |
| T16 | [.::].-....:,,(.),:<br>[07.26 15:29:28] chrome.exe - client.github.user.content.com:443 close, 335 bytes sent, 4369 bytes (3.93 KB) received, lifetime 03:15 |
| T17 | [.::].-....:,,(.),:<br>[07.26 15:29:28] chrome.exe - client.github.user.content.com:443 close, 335 bytes sent, 4369 bytes (3.93 KB) received, lifetime 03:15 |
| T18 | [.::].-....:,,(.),:<br>[07.26 15:29:28] chrome.exe - client.github.user.content.com:443 close, 335 bytes sent, 4369 bytes (3.93 KB) received, lifetime 03:15 |
| T19 | [.::]-.-...::....:<br>[10.30 18:04:14] Skype-remote.exe - 86.99.222.235:443 error : Could not connect through proxy proxy.cse.cuhk.edu.hk:5070 |
| T20 | [.::]-.-...::....:<br>[10.30 18:04:15] Skype-remote.exe - 86.99.222.235:443 error : Could not connect through proxy proxy.cse.cuhk.edu.hk:5070 |
| T21 | [.::]-.-...::....:<br>[10.30 18:04:15] Skype-remote.exe - 86.99.222.235:443 error : Could not connect through proxy proxy.cse.cuhk.edu.hk:5070 |
| T22 | [.::]-.-...::....:<br>[10.30 18:04:16] Skype-remote.exe - 86.99.222.235:443 error : Could not connect through proxy proxy.cse.cuhk.edu.hk:5070 |
| T23 | [.::]-.-...::....:<br>[10.30 18:04:16] Skype-remote.exe - 86.99.222.235:443 error : Could not connect through proxy proxy.cse.cuhk.edu.hk:5070 |

In a next step 120, the log messages are sorted lexicographically, according to the ASCII values of the fingerprints. The disclosure is, of course, neither limited to lexicographical sorting nor to ASCII codes only. The advantage of performing a lexicographical sorting (as opposed to other orderings, such as by frequencies or content) is that common prefixes and/or common suffixes, can be removed easily. It is e.g. also possible to use other codes, e.g. Unicode encodings, such as UTF-8, which is even backwards compatible with the ASCII code.

The list of sorted log messages 130 is as follows (see also FIG. 4):

| | |
|---|---|
| T7  | [.::]-***-.-....:,,(.),:<br>[07.26 15:29:27] chrome-remote *64 *32 *128 - user.images-remote.github.user.content.com:443 close, 335 bytes sent, 4369 bytes (4.26 KB) rec |
| T19 | [.::]-.-...::....:<br>[10.30 18:04:14] Skype-remote.exe - 86.99.222.235:443 error : Could not connect through proxy proxy.cse.cuhk.edu.hk:5070 |
| T20 | [.::]-.-...::....:<br>[10.30 18:04:15] Skype-remote.exe - 86.99.222.235:443 error : Could not connect through proxy proxy.cse.cuhk.edu.hk:5070 |
| T21 | [.::]-.-...::....:<br>[10.30 18:04:15] Skype-remote.exe - 86.99.222.235:443 error : Could not connect through proxy proxy.cse.cuhk.edu.hk:5070 |

-continued

| | |
|---|---|
| T22 | [.::]-.-...:,....: <br> [10.30 18:04:16] Skype-remote.exe - 86.99.222.235:443 error : Could not connect through proxy proxy.cse.cuhk.edu.hk:5070 |
| T23 | [.::]-.-...:,....: <br> [10.30 18:04:16] Skype-remote.exe - 86.99.222.235:443 error : Could not connect through proxy proxy.cse.cuhk.edu.hk:5070 |
| T1 | [.::].*---..:,,(.),: <br> [07.26 14:14:18] chrome.exe *64 - f-log-extension.grammarly.io:443 close, 849 bytes sent, 3626 bytes (3.54 KB) received, lifetime 01:01 |
| T2 | [.::].*---..:,,(.),: <br> [07.26 15:25:19] chrome.exe *64 - zhihu-web-analytics.zhihu.com:443 close, 343 bytes sent, 3122 bytes (3.04 KB) received, lifetime 00:11 |
| T3 | [.::].*---..:,,(.),: <br> [07.26 15:25:19] chrome.exe *64 - zhihu-web-analytics.zhihu.com:443 close, 343 bytes sent, 3122 bytes (3.04 KB) received, lifetime 00:11 |
| T4 | [.::].*--..:,,(.),: <br> [07.26 16:27:39] chrome.exe *64 - hkg3-2.fbcdn.net:443 close, 339 bytes sent, 3826 bytes (3.73 KB) received, lifetime 00:21 |
| T5 | [.::].*-...:,,(.),: <br> [07.26 15:29:26] chrome.exe *64 - user.images.githubusercontent.com:443 close, 335 bytes sent, 4369 bytes (4.26 KB) received, lifetime 03:15 |
| T6 | [.::].*-...:,,(.),: <br> [07.26 15:29:27] chrome.exe *64 - user.images.githubusercontent.com:443 close, 335 bytes sent, 4369 bytes (4.26 KB) received, lifetime 03:15 |
| T8 | [.::].*-...:,,(.),< <br> [07.26 15:29:31] chrome.exe *64 - 12.client.google.com:443 close, 474 bytes sent, 4042 bytes (3.94 KB) received, lifetime <1 sec |
| T9 | [.::].*-..:,,(.),: <br> [07.26 15:29:27] chrome.exe *64 - github.usercontent.com:443 close, 335 bytes sent, 4369 bytes (4.26 KB) received, lifetime 03:15 |
| T10 | [.::].--..:,,(.),: <br> [07.26 15:29:28] chrome.exe - remote-user.content.com:443 close, 335 bytes sent, 4369 bytes (4.26 KB) received, lifetime 03:15 |
| T11 | [.::].-.-..:,,( ),< <br> [07.26 15:29:28] chrome.exe - 15.user-remote.content.com:443 close, 335 bytes sent, 4369 bytes (426 KB) received, lifetime <1 sec |
| T12 | [.::].-....:,,( ),: <br> [07.26 15:29:28] chrome.exe - client.github.user.content.com:443 close, 335 bytes sent, 4369 bytes (426 KB) received, lifetime 03:15 |
| T13 | [.::].-....:,,( ),: <br> [07.26 15:29:28] chrome.exe - client.github.user.content.com:443 close, 335 bytes sent, 4369 bytes (426 KB) received, lifetime 03:15 |
| T14 | [.::].-....:,,( ),: <br> [07.26 15:29:28] chrome.exe - client.github.user.content.com:443 close, 335 bytes sent, 4369 bytes (426 KB) received, lifetime 03:15 |
| T15 | [.::].-....:,,(.),: <br> [07.26 15:29:28] chrome.exe - client.github.user.content.com:443 close, 335 bytes sent, 4369 bytes (3.93 KB) received, lifetime 03:15 |
| T16 | [.::].-....:,,(.),: <br> [07.26 15:29:28] chrome.exe - client.github.user.content.com:443 close, 335 bytes sent, 4369 bytes (3.93 KB) received, lifetime 03:15 |
| T17 | [.::].-....:,,(.),: <br> [07.26 15:29:28] chrome.exe - client.github.user.content.com:443 close, 335 bytes sent, 4369 bytes (3.93 KB) received, lifetime 03:15 |
| T18 | [.::].-....:,,(.),: <br> [07.26 15:29:28] chrome.exe - client.github.user.content.com:443 close, 335 bytes sent, 4369 bytes (3.93 KB) received, lifetime 03:15 |

Sorting of large or even very large lists of log messages can be done very quickly with complexity $\Omega(n*\log(n))$.

In a next step 140, log messages having identical fingerprints are pre-clustered into corresponding clusters (see also FIG. 5). This results in 11 clusters, as opposed to originally 23 clusters. The fingerprints of the log messages belonging to the respective clusters are given below:

| | |
|---|---|
| Cluster 1 | |
| F7 | [.::]-***-.-....:,,(.),: |
| Cluster 2 | |
| F19, | [.::]-.-...:,....: |
| F20, | [.::]-.-...:,....: |
| F21, | [.::]-.-...:,....: |
| F22, | [.::]-.-...:,....: |
| F23 | [.::]-.-...:,....: |
| Cluster 3 | |
| F1, | [.::].*---..:,,(.),: [.::].*---..:,,(.),: [.::].*---..:,,(.),: |
| F2, | |
| F3 | |
| Cluster 4 | |
| F4 | [.::].*--..:,,(.),: |
| Cluster 5 | |
| F5, | [.::].*-...:,,(.),: |
| F6 | [.::].*-...:,,(.),: |
| Cluster 6 | |
| F8 | [.::].*-...:,,(.),< |
| Cluster 7 | |
| F9 | [.::].*-..:,,(.),: |
| Cluster 8 | |
| F10 | [.::].--..:,,(.),: |
| Cluster 9 | |
| F11 | [.::].-.-..:,,( ),< |
| Cluster 10 | |
| F12, | [.::].-....:,,( ),: |
| F13, | [.::].-....:,,( ),: |
| F14 | [.::].-....:,,( ),: |
| Cluster 11 | |
| F15, | [.::].-....:,,(.),: |
| F16, | [.::].-....:,,(.),: |
| F17, | [.::].-....:,,(.),: |
| F18 | [.::].-....:,,(.),: |

This intermediate result may also be written as, which indicates that e.g. the fingerprints F19-F23 of log messages L19-L23 share the same fingerprint "[.::]-.-...::,....:":

| | |
|---|---|
| Cluster 1 | |
| F7 | [.::]-***-.-....:,,(.),: |
| Cluster 2 | |
| F19, F20, F21, F22, F23 | [.::]-.-...:,....: |
| Cluster 3 | |
| F1, F2, F3 | [.::].*---..:,,(.),: |
| Cluster 4 | |
| F4 | [.::].*--..:,,(.),: |
| Cluster 5 | |
| F5, F6 | [.::].*-...:,,(.),: |
| Cluster 6 | |
| F8 | [.::].*-...:,,(.),< |
| Cluster 7 | |
| F9 | [.::].*-..:,,(.),: |
| Cluster 8 | |
| F10 | [.::].--..:,,(.),: |
| Cluster 9 | |
| F11 | [.::].-.-..:,,( ),< |
| Cluster 10 | |
| F12, F13, F14 | [.::].-....:,,( ),: |
| Cluster 11 | |
| F15, F16, F17, F18 | [.::].-....:,,(.),: |

The list of pre-clustered log messages 150 is depicted in FIG. 5.

In a next step 160, the first pass in clustering of the pre-clustered log messages 150 is performed (see also FIG. 6). At this point, it is checked whether the fingerprint of a first cluster is "sufficiently similar" to the fingerprint of a subsequent second cluster. In this example, in a first pass three subsequent clusters, i.e. NC=3, are considered. The similarity is checked using the normalized edit distance, short NED, which is defined as the edit distance between the fingerprint of the cluster and the fingerprint of one of the subsequent clusters divided by the maximum length of these fingerprints. If the normalized edit distance NED is smaller or equal to a similarity threshold sim Thresh, then the two fingerprints are merged into one cluster.

Please note that the calculation of the edit distance involves quadratic complexity $\Omega(n^2)$. In order to reduce the load to the processors, two measures may be foreseen: First, the edit distance are checked in the immediate vicinity of one cluster, say 3 subsequent clusters. Of course, other numbers of subsequent clusters, such as 5 or 10, are also possible. Preceding clusters do not have to be checked due to symmetry conditions or the commutative property of the edit distance. By that is meant that the edit distance between string 1 and string 2 is the same as the edit distance between string 2 and string 1. Second, whenever possible, the length of the fingerprints shall be reduced further, e.g. by removing common leading and trailing portions of the fingerprint strings (see also below).

Since calculating the NED is computationally expensive, it is possible to estimate a lower limit for the NED between two fingerprints. In case, the fingerprints F1 and F2 have different lengths, the minimum value for NED is $$NED \geq \frac{|length(F1) - length(F2)|}{\max(length(F1), length(F2))}.$$

This estimate for NED is computationally not expensive and adds to the efficiency of the inventive method. A very simple example for this is given below: Assuming a first fingerprint F1 has a length 2 and a second fingerprint F2 has a length 3. Therefore $$NED \geq \frac{|length(F1) - length(F2)|}{\max(length(F1), length(F2))} = \frac{|2-3|}{\max(2,3)} = \frac{1}{3} \approx 0.33.$$

If the similarity threshold sim Thresh is 0.25 or even 0.3, the NED does not have to be calculated in detail, since the minimum value is surely above the similarity threshold. In addition, there's another possibility to reduce the computational effort to calculate the NED. Assuming that two fingerprints F1 and F2 have lengths M and N, namely length(F1)=M and length(F2)=N, and that the $1^{st}$ fingerprint is longer than the $2^{nd}$ fingerprint, i.e. M>N. In this case, the upper bound B for the maximum permissible edit distance between F1 and F2 is B=simThres*M.

Consequently, when calculating the edit distance, the calculation can be stopped if the number of edits surpasses B. This makes the computer implemented method even more computationally efficient.

The clustering starts at cluster 1 (see FIG. 6). First, it is checked whether the fingerprint F7="[.::]-*-.-. . . .:,,(.),:" of cluster 1 is similar to the fingerprint of cluster 2**, e.g. F19="[.::]-.-. . . ::. . . . .:". Please note that the fingerprints F19-F23 are identical, hence only one check needs to be performed. The edit distance between F7 and F19 is 10, which means that 10 insertions, deletions or substitutions of characters are necessary to transform the first fingerprint into the second fingerprint. The length of the fingerprint string F7 is 24 and the length of the fingerprint string F19 is 18. The normalized edit distance NED between a first fingerprint F1 and a second fingerprint F2 is defined as $$NED(F1, F2) = \frac{\text{edit distance}(F1, F2)}{\max[length(F1), length(F2)]}.$$

In our case, NED(F7, F19)=10/(max(18, 24)=10/24≈0.42. In this example, a similarity threshold sim Thresh of 0.25 will be assumed, i.e. two clusters will be combined if NED≤0.25. It is understood that both smaller and larger similarity thresholds can be used without leaving the teaching of the disclosure. As 0.42 is >0.25, clusters 1 and 2 will not be combined, i.e. they remain separate. Next it will be tried whether clusters 1 and 3 are similar enough to be combined into a single cluster. Therefore, NED(F7, F1) is calculated. As NED(F7, F1)=0.25, the clusters 1 and 3 will be combined into a single cluster. In the first pass, it will be checked whether three subsequent clusters are similar to a respective start cluster. Therefore, it remains to be checked whether clusters 1 and 4 are similar enough to be combined into a single cluster. Therefore, NED(F7, F4) is calculated. As NED(F7, F1)≤0.25, also clusters 1 and 4 will be combined into a single cluster.

As an intermediary result, the following clusters are present:

| | |
|---|---|
| Cluster 1 | |
| F7 | [.::]-***-.-....:,,(.),: |
| F1, F2, F3 | [.::].*---..:,,(.),: |
| F4 | [.::].*--..:,,(.),: |
| Cluster 2 | |
| F19, F20, F21, F22, F23 | [.::]-.-...::..... |
| Cluster 3 | |
| F5, F6 | [.::].*-....:,,(.),: |
| Cluster 4 | |
| F8 | [.::].*-..:,,(.),< |
| Cluster 5 | |
| F9 | [.::].*-..:,,(.),: |
| Cluster 6 | |
| F10 | [.::].--..:,,(.),: |
| Cluster 7 | |
| F11 | [.::].-.-..:,,( ),< |
| Cluster 8 | |
| F12, F13, F14 | [.::].-....:,,( ),: |
| Cluster 9 | |
| F15, F16, F17, F18 | [.::].-....:,,(.),: |

Next, it is checked whether cluster 2 is sufficiently similar to be combined with one or more of three subsequent clusters, i.e. clusters 3, 4, 5. Therefore, the NED(F19,F5), NED(F19, F8) and NED(F19, F9) will be calculated. It turns out, that the normalized edit distances for all of these combinations is >0.25, therefore, these clusters remain separate.

Next, it is checked whether cluster 3 is sufficiently similar to be combined with one or more of the three subsequent clusters, i.e. clusters 4, 5, 6. Therefore, the NED(F5, F8), NED(F5, F9) and NED(F5, F10) will be calculated. It turns out, that the normalized edit distances for all of these combinations are <0.25, therefore, these clusters will be combined.

After this step, the following clusters are present:

| | |
|---|---|
| Cluster 1 | |
| F7 | [.::]-***-.-....:,,(.),: |
| F1, F2, F3 | [.::].*---..:,,(.),: |
| F4 | [.::].*--..:,,(.),: |

-continued

| | |
|---|---|
| Cluster 2 | |
| F19, F20, F21, F22, F23 | [.::]-.-....::.....: |
| Cluster 3 | |
| F5, F6 | [.::].*-...:,,(.),: |
| F8 | [.::].*-...:,,(.),< |
| F9 | [.::].*-..:,,(.),: |
| F10 | [.::].--..:,,(.),: |
| Cluster 4 | |
| F11 | [.::].-.-..:,,( ),< |
| Cluster 5 | |
| F12, F13, F14 | [.::].-....:,,( ),: |
| Cluster 6 | |
| F15, F16, F17, F18 | [.::].-....:,,(.),: |

Next, it is checked whether the fingerprint of cluster 4 is sufficiently similar to the fingerprints of three subsequent clusters. As there are only two subsequent clusters left, only clusters 5 and 6 are checked for similarity. It turns out that both NED(F11, F12) and NED(F11, F15) are smaller than the similarity threshold of 0.25, therefore clusters 5 and 6 will be combined with cluster 4. After this, the following clusters are present:

| | |
|---|---|
| Cluster 1 | |
| F7 | [.::]-***-.-....:,,(.),: |
| F1, F2, F3 | [.::].*---..:,,(.),: |
| F4 | [.::].*--..:,,(.),: |
| Cluster 2 | |
| F19, F20, F21, F22, F23 | [.::]-.-....::.....: |
| Cluster 3 | |
| F5, F6 | [.::].*-...:,,(.),: |
| F8 | [.::].*-...:,,(.),< |
| F9 | [.::].*-..:,,(.),: |
| F10 | [.::].--..:,,(.),: |
| Cluster 4 | |
| F11 | [.::].-.-..:,,( ),< |
| F12, F13, F14 | [.::].-....:,,( ),: |
| F15, F16, F17, F18 | [.::].-....:,,(.),: |

In the first pass of clustering, the following similarity metrics were calculated or estimates for it were evaluated:

| Similarity Metric | Num. value | Similarity Metric | NED ≤ simThresh |
|---|---|---|---|
| NED (F7, F19) | XX | NED (F7, F19) | TRUE |
| NED (F7, F1) | XX | NED (F7, F1) | TRUE |
| NED (F7, F4) | XX | NED (F7, F4) | TRUE |
| NED (F19, F5) | XX | NED (F19, F5) | FALSE |
| NED (F19, F8) | XX | NED (F19, F8) | FALSE |
| NED (F19, F9) | XX | NED (F19, F9) | FALSE |
| NED (F5, F8) | XX | NED (F5, F8) | TRUE |
| NED (F5, F9) | XX | NED (F5, F9) | TRUE |
| NED (F5, F10) | XX | NED (F5, F10) | TRUE |
| NED (F11, F12) | XX | NED (F11, F12) | TRUE |
| NED (F11, F15) | XX | NED (F11, F15) | TRUE |

It is understood that either the numerical values (not indicated above, just a placeholder "XX" for it) for the similarity metrics (in our case, the normalized edit distance NED, see left table) or just a Boolean value whether the similarity metric is ≤sim Thresh (see right table) can be stored in a lookup table. The reason for it being that in a $2^{nd}$ pass of clustering, the same similarity metrics may be asked again. If this is the case, the result can be immediately taken from the lookup table.

Since the $1^{st}$ pass of clustering reduced the number of clusters from 11 to 4, a stopping condition is not met. Therefore, as an optional additional step, a second pass of clustering 170 will be executed. In this case, the clustering will be repeated, however, 6 subsequent clusters will be checked for similarity. Although each cluster 1, 3 and 4 comprises different fingerprints, only one (typically the first) fingerprint is used for checking the similarity with the fingerprint of another cluster.

At the beginning, it is checked whether the fingerprint of cluster 1 is similar to the fingerprints of 6 subsequent clusters. The similarity threshold simThresh remains at 0.25. As there are only three subsequent clusters, NED(F7, F19), NED(F7, F5) and NED(F7,F11) will be checked. Clusters 1 and 2 are dissimilar as NED(F7, F19)>0.25, therefore, these clusters remain separate. Note that as NED(F7, F19) is already contained in a lookup table, no calculation is necessary. However, NED(F7, F5)≤0.25, therefore, clusters 1 and 3 are combined. As NED(F7, F11)>0.25, clusters 1 and 4 remain separate. After this, the following clusters are present:

| | |
|---|---|
| Cluster 1 | |
| F7 | [.::]-***-.-....:,,(.),: |
| F1, F2, F3 | [.::].*---..:,,(.),: |
| F4 | [.::].*--..:,,(.),: |
| F5, F6 | [.::].*-...:,,(.),: |
| F8 | [.::].*_...:,,(.),< |
| F9 | [.::].*-..:,,(.),: |
| F10 | [.::].--..:,,(.),: |
| Cluster 2 | |
| F19, F20, F21, F22, F23 | [.::]-.-....::.....: |
| Cluster 3 | |
| F11 | [.::].-.-..:,,( ),< |
| F12, F13, F14 | [.::].-....:,,( ),: |
| F15, F16, F17, F18 | [.::].-....:,,(.),: |

Next, it is checked whether the fingerprint of cluster 2 is similar with the fingerprints of 6 subsequent clusters. As there is only one subsequent cluster left, i.e. cluster 3, it remains to be checked whether the fingerprints of clusters 2 and 3 are similar. As NED(F19, F11)>0.25, clusters 2 and 3 remain separate.

According to the disclosure, it would be possible to perform another pass, say a third pass, until a so-called stopping condition is met. One possible stopping condition can be considered to be met if in the last pass, the total number of clusters remained constant, i.e. no clusters were merged, or if the number of clusters was reduced by less than a given threshold value. This is schematically displayed in FIG. 7, where the presence of fewer clusters 190 in the last clustering pass either requires an additional clustering pass, or in case the clusters were not reduced in the last pass, the list of clustered log messages 180 is outputted. For reasons of brevity, no third pass is demonstrated here.

After all this, it turns out that the fingerprints F1-F10 of the log messages L1-L10 and consequently also the log messages L1-L10 themselves are similar and may be clustered into a cluster (cluster 1 above), the log messages L11-L18 are similar and may be clustered into a cluster (cluster 3 above) and that the log messages L19-L23 are similar and may be clustered into a cluster (cluster 2 above), see result 180 below showing both the fingerprints and the log messages in couples/doubles (see also FIG. 8):

TABLE 3

Clustered log lines L1-L23 according to $1^{st}$ application example

Cluster 1
T7    [. : : ] - * * * - . - . . . . . : , , ( . ) , :
      [07.26 15:29:27] chrome-remote *64 *32 *128 - user.images-
      remote.github.user.content.com:443 close, 335 bytes sent,
      4369 bytes (4.26 KB) rec TABLE 3-continued Clustered log lines L1-L23 according to 1st application example

| | |
|---|---|
| T1 | [ . : : ] . * - - - . . : , , ( . ) , :<br>[07.26 14:14:18] chrome.exe *64 - f-log-extension.grammarly.io:443 close, 849 bytes sent, 3626 bytes (3.54 KB) received, lifetime 01:01 |
| T2 | [ . : : ] . * - - - . . : , , ( . ) , :<br>[07.26 15:25:19] chrome.exe *64 - zhihu-web-analytics. zhihu.com:443 close, 343 bytes sent, 3122 bytes (3.04 KB) received, lifetime 00:11 |
| T3 | [ . : : ] . * - - - . . : , , ( . ) , :<br>[07.26 15:25:19] chrome.exe *64 - zhihu-web-analytics.zhihu.com:443 close, 343 bytes sent, 3122 bytes (3.04 KB) received, lifetime 00:11 |
| T4 | [ . : : ] . * - - . . : , , ( . ) , :<br>[07.26 16:27:39] chrome.exe *64 - hkg3-2.fbcdn.net:443 close, 339 bytes sent, 3826 bytes (3.73 KB) received, lifetime 00:21 |
| T5 | [ . : : ] . * - - . . : , , ( . ) , :<br>[07.26 15:29:26] chrome.exe *64 - user.images.githubusercontent.com:443 close, 335 bytes sent, 4369 bytes (4.26 KB) received, lifetime 03:15 |
| T6 | [ . : : ] . * - - . . : , , ( . ) , :<br>[07.26 15:29:27] chrome.exe *64 - user.images.githubusercontent.com:443 close, 335 bytes sent, 4369 bytes (4.26 KB) received, lifetime 03:15 |
| T8 | [ . : : ] . * - - . . : , , ( . ) , <<br>[07.26 15:29:31] chrome.exe *64 - 12.client.google.com:443 close, 474 bytes sent, 4042 bytes (3.94 KB) received, lifetime <1 sec |
| T9 | [ . : : ] . * - - . . : , , ( . ) , :<br>[07.26 15:29:27] chrome.exe *64 - github.usercontent.com:443 close, 335 bytes sent, 4369 bytes (4.26 KB) received, lifetime 03:15 |
| T10 | [ . : : ] . - - . . : , , ( . ) , :<br>[07.26 15:29:28] chrome.exe - remote-user.content.com:443 close, 335 bytes sent, 4369 bytes (4.26 KB) received, lifetime 03:15 |
| Cluster 2 | |
| T19 | [ . : : ] - . - . . . : : . . . :<br>[10.30 18:04:14] Skype-remote.exe - 86.99.222.235:443 error : Could not connect through proxy proxy.cse.cuhk.edu.hk:5070 |
| T20 | [ . : : ] - . - . . . : : . . . :<br>[10.30 18:04:15] Skype-remote.exe - 86.99.222.235:443 error : Could not connect through proxy proxy.cse.cuhk.edu.hk:5070 |
| T21 | [ . : : ] - . - . . . : : . . . :<br>[10.30 18:04:15] Skype-remote.exe - 86.99.222.235:443 error : Could not connect through proxy proxy.cse.cuhk.edu.hk:5070 |
| T22 | [ . : : ] - . - . . . : : . . . :<br>[10.30 18:04:16] Skype-remote.exe - 86.99.222.235:443 error : Could not connect through proxy proxy.cse.cuhk.edu.hk:5070 |
| T23 | [ . : : ] - . - . . . : : . . . :<br>[10.30 18:04:16] Skype-remote.exe - 86.99.222.235:443 error : Could not connect through proxy proxy.cse.cuhk.edu.hk:5070 |
| Cluster 3 | |
| T11 | [ . : : ] . - - . . : , , ( ) , <<br>[07.26 15:29:28] chrome.exe - 15.user-remote.content.com:443 close, 335 bytes sent, 4369 bytes (426 KB) received, lifetime <1 sec |
| T12 | [ . : : ] . - . . . : , , ( ) , :<br>[07.26 15:29:28] chrome.exe - client.github.user.content.com:443 close, 335 bytes sent, 4369 bytes (426 KB) received, lifetime 03:15 |
| T13 | [ . : : ] . - . . . : , , ( ) , :<br>[07.26 15:29:28] chrome.exe - client.github.user.content.com:443 close, 335 bytes sent, 4369 bytes (426 KB) received, lifetime 03:15 |
| T14 | [ . : : ] . - . . . : , , ( ) , :<br>[07.26 15:29:28] chrome.exe - client.github.user.content.com:443 close, 335 bytes sent, 4369 bytes (426 KB) received, lifetime 03:15 |
| T15 | [ . : : ] . - . . . : , , ( . ) , :<br>[07.26 15:29:28] chrome.exe - client.github.user.content.com:443 close, 335 bytes sent, 4369 bytes (3.93 KB) received, lifetime 03:15 |
| T16 | [ . : : ] . - . . . : , , ( . ) , :<br>[07.26 15:29:28] chrome.exe - client.github.user.content.com:443 close, 335 bytes sent, 4369 bytes (3.93 KB) received, lifetime 03:15 |
| T17 | [ . : : ] . - . . . : , , ( . ) , :<br>[07.26 15:29:28] chrome.exe - client.github.user.content.com:443 close, 335 bytes sent, 4369 bytes (3.93 KB) received, lifetime 03:15 |
| T18 | [ . : : ] . - . . . : , , ( . ) , :<br>[07.26 15:29:28] chrome.exe - client.github.user.content.com:443 close, 335 bytes sent, 4369 bytes (3.93 KB) received, lifetime 03:15 |

To illustrate the influence of the similarity threshold on the number of clusters identified, a second example is described using a similarity threshold of 0.3 (instead of 0.25). All other parameters, such as the list of log messages 100, number of subsequent clusters checked for similarity remain unchanged, i.e. as in the 1st application example.

The fingerprinting of the log messages, the sorting and the pre-clustering are identical to the 1st application example. Therefore, the following 11 clusters are present before the 1st pass of the clustering:

| | |
|---|---|
| Cluster 1 | |
| F7 | [.::]-***-.-.....:,,(.),: |
| Cluster 2 | |
| F19, F20, F21, F22, F23 | [.::]-.-...::....: |
| Cluster 3 | |
| F1, F2, F3 | [.::].*---..:,,(.),: |
| Cluster 4 | |
| F4 | [.::].*--..:,,(.),: |
| Cluster 5 | |
| F5, F6 | [.::].*-...:,,(.),: |
| Cluster 6 | |
| F8 | [.::].*-...:,,(.),< |
| Cluster 7 | |
| F9 | [.::].*-..:,(.),: |
| Cluster 8 | |
| F10 | [.::].--..:,,(.),: |
| Cluster 9 | |
| F11 | [.::].-.-..:,,( ),< |
| Cluster 10 | |
| F12, F13, F14 | [.::].-....:,,( ),: |
| Cluster 11 | |
| F15, F16, F17, F18 | [.::].-....:,,(.),: |

At the beginning, the similarity between cluster 1 and three subsequent clusters 2, 3 and 4 is investigated. Therefore, NED(F7,F19), NED(F7,F1) and NED(F7,F4) are calculated. NED(F7,F19)=10/24=0.41>0.3; NED(F7,F1)=6/24=0.25≤0.3 and NED(F7,F4)=6/24=0.25≤0.3. Therefore cluster 1 is merged with clusters 3 and 4 but not with cluster 2. The resulting clusters are:

| | |
|---|---|
| Cluster 1 | |
| F7 | [.::]-***-.-.....:,,(.),: |
| F1, F2, F3 | [.::].*---..:,,(.),: |
| F4 | [.::].*--..:,,(.),: |
| Cluster 2 | |
| F19, F20, F21, F22, F23 | [.::]-.-...::....: |
| Cluster 3 | |
| F5, F6 | [.::].*-...:,,(.),: |
| Cluster 4 | |
| F8 | [.::].*-...:,,(.),< |
| Cluster 5 | |
| F9 | [.::].*-..:,(.),: |
| Cluster 6 | |
| F10 | [.::].--..:,,(.),: |
| Cluster 7 | |
| F11 | [.::].-.-..:,,( ),< |

-continued

| | |
|---|---|
| Cluster 8 | |
| F12, F13, F14 | [.::].-----:,,( ),: |
| Cluster 9 | |
| F15, F16, F17, F18 | [.::].-.....:,,(.),: |

Next, cluster 2 is compared for similarity with clusters 3, 4 and 5. This results in NED(F19,F5)=7/19=0.36>0.3, NED (F19,F8)=8/19=0.42>0.3 and NED(F19,F9)=8/19=0.42>0.3. Therefore no clusters are merged at this point.

Next, cluster 3 is compared for similarity with clusters 4, 5 and 6. This results in NED(F5,F8)=1/19=0.05≤0.3, NED (F5,F9)=1/19=0.05≤0.3 and NED(L5,L10)=2/19=0.10≤0.3. Therefore, cluster 3 is merged with clusters 4, 5 and 6. The resulting clusters are:

| | |
|---|---|
| Cluster 1 | |
| F7 | [.::].-***-.-.....:,(.),: |
| F1, F2, F3 | [.::].*---..:,(.),: |
| F4 | [.::].*--..:,(.),: |
| Cluster 2 | |
| F19, F20, F21, F22, F23 | [.::]-.-...::....: |
| Cluster 3 | |
| F5, F6 | [.::].*-...:,,(.),: |
| F8 | [.::].*-...:,,(.),:< |
| F9 | [.::].*-..:,(.),: |
| F10 | [.::].--..:,(.),: |
| Cluster 4 | |
| F11 | [.::].-.-..:,,( ),< |
| Cluster 5 | |
| F12, F13, F14 | [.::].-.....:,,( ),: |
| Cluster 6 | |
| F15, F16, F17, F18 | [.::].-.....:,(.),: |

Next, cluster 4 is compared for similarity with clusters 5 and 6. This results in NED(F11,F12)=2/18=0.11≤0.3 and NED(F11,F15)=3/19=0.15≤0.3. Therefore, cluster 4 is merged with clusters 5 and 6. The resulting clusters after conclusion of the 1$^{st}$ pass are:

| | |
|---|---|
| Cluster 1 | |
| F7 | [.::].-***-.-.....:,(.),: |
| F1, F2, F3 | [.::].*---..:,(.),: |
| F4 | [.::].*--..:,(.),: |
| Cluster 2 | |
| F19, F20, F21, F22, F23 | [.::]-.-...::....: |
| Cluster 3 | |
| F5, F6 | [.::].*-...:,,(.),: |
| F8 | [.::].*-...:,,(.),:< |
| F9 | [.::].*-..:,(.),: |
| F10 | [.::].--..:,(.),: |
| Cluster 4 | |
| F11 | [.::].-.-..:,,( ),< |
| F12, F13, F14 | [.::].-.....:,,( ),: |
| F15, F16, F17, F18 | [.::].-.....:,(.),: |

Since the number of clusters was reduced from 11 to 4 in the 1$^{st}$ pass, another clustering pass is performed. In the second pass, cluster 1 is compared with clusters 2, 3 and 4. As the similarity between fingerprints F7 and F19 was already evaluated in the 1$^{st}$ pass and the results were kept in a lookup table, no further evaluation is necessary. NED(F7, F5)=6/24=0.25≤0.3 and NED(F7,F11)=8/24=0.33>0.3. Therefore cluster 1 is merged only with cluster 3. The remaining clusters are:

| | |
|---|---|
| Cluster 1 | |
| F7 | [.::]-***-.-.....:,,(.),: |
| F1, F2, F3 | [.::].*---..:,,(.),: |
| F4 | [.::].*--..:,,(.),: |
| Cluster 2 | |
| F19, F20, F21, F22, F23 | [.::]-.-...::....: |
| F5, F6 | [.::].*-....:,,(.),: |
| F8 | [.::].*_....:,,(.),< |
| F9 | [.::].*-..:,,(.),: |
| F10 | [.::].--..:,,(.),: |
| Cluster 3 | |
| F11 | [.::].-.-..:,,( ),< |
| F12, F13, F14 | [.::].-....:,,( ),: |
| F15, F16, F17, F18 | [.::].-....:,,(.),: |

In the final step, the similarity between clusters 2 and 3 is evaluated. This results in NED(F19,F11)=8/18=0.44>0.3. Therefore no more merging takes place. Finally, the following output is given:

TABLE 4

Clustered log lines L1-L23 according to 2$^{nd}$ application example

| | |
|---|---|
| Cluster 1 | |
| T1 | [ . : : ] . * - - - - . : , , ( . ) , : |
| | [07.26 14:14:18] chrome.exe *64 - f-log-extension.grammarly.io:443 close, 849 bytes sent, 3626 bytes (3.54 KB) received, lifetime 01:01 |
| T2 | [ . : : ] . * - - - - . : , , ( . ) , : |
| | [07.26 15:25:19] chrome.exe *64 - zhihu-web-analytics. zhihu.com:443 close, 343 bytes sent, 3122 bytes (3.04 KB) received, lifetime 00:11 |
| T3 | [ . : : ] . * - - - - . : , , ( . ) , : |
| | [07.26 15:25:19] chrome.exe *64 - zhihu-web-analytics.zhihu.com:443 close, 343 bytes sent, 3122 bytes (3.04 KB) received, lifetime 00:11 |
| T4 | [ . : : ] . * - - . . : , , ( . ) , : |
| | [07.26 16:27:39] chrome.exe *64 - hkg3-2.fbcdn.net:443 close, 339 bytes sent, 3826 bytes (3.73 KB) received, lifetime 00:21 |
| T7 | [ . : : ] - * * * - . - . . . . . : , , ( . ) , : |
| | [07.26 15:29:27] chrome-remote *64 *32 *128 - user.images-remote.github.user.content.com:443 close, 335 bytes sent, 4369 bytes (4.26 KB) rec |
| Cluster 2 | |
| T5 | [ . : : ] . * - . . . . : , , ( . ) , : |
| | [07.26 15:29:26] chrome.exe *64 - user.images.githubusercontent.com:443 close, 335 bytes sent, 4369 bytes (4.26 KB) received, lifetime 03:15 |
| T6 | [ . : : ] . * - . . . . : , , ( . ) , : |
| | [07.26 15:29:27] chrome.exe *64 - user.images.githubusercontent.com:443 close, 335 bytes sent, 4369 bytes (4.26 KB) received, lifetime 03:15 |
| T8 | [ . : : ] . * - . . . . : , , ( . ) , < |
| | [07.26 15:29:31] chrome.exe *64 - 12.client.google.com:443 close, 474 bytes sent, 4042 bytes (3.94 KB) received, lifetime <1 sec |
| T9 | [ . : : ] . * - . . : , , ( . ) , : |
| | [07.26 15:29:27] chrome.exe *64 - github.usercontent.com:443 close, 335 bytes sent, 4369 bytes (4.26 KB) received, lifetime 03:15 |
| T10 | [ . : : ] . - - - . : , , ( . ) , : |
| | [07.26 15:29:28] chrome.exe - remote-user.content.com:443 close, 335 bytes sent, 4369 bytes (4.26 KB) received, lifetime 03:15 |
| T19 | [ . : : ] - . - . . . . : : . . . . : |
| | [10.30 18:04:14] Skype-remote.exe - 86.99.222.235:443 error : Could not connect through proxy proxy.cse.cuhk.edu.hk:5070 |
| T20 | [ . : : ] - . - . . . . : : . . . . : |
| | [10.30 18:04:15] Skype-remote.exe - 86.99.222.235:443 error : Could not connect through proxy proxy.cse.cuhk.edu.hk:5070 |
| T21 | [ . : : ] - . - . . . . : : . . . . : |
| | [10.30 18:04:15] Skype-remote.exe - 86.99.222.235:443 error : Could not connect through proxy proxy.cse.cuhk.edu.hk:5070 |
| T22 | [ . : : ] - . - . . . . : : . . . . : |
| | [10.30 18:04:16] Skype-remote.exe - 86.99.222.235:443 error : Could not connect through proxy proxy.cse.cuhk.edu.hk:5070 |

TABLE 4-continued

Clustered log lines L1-L23 according to 2$^{nd}$ application example

| | |
|---|---|
| T23 | [ . : : ] - . - . . . : . . . . :<br>[10.30 18:04:16] Skype-remote.exe - 86.99.222.235:443 error : Could not connect through proxy proxy.cse.cuhk.edu.hk:5070 |
| Cluster 3 | |
| T11 | [ . : : ] . - . - . . . : , , ( ) , <<br>[07.26 15:29:28] chrome.exe - 15.user-remote.content.com:443 close, 335 bytes sent, 4369 bytes (426 KB) received, lifetime <1 sec |
| T12 | [ . : : ] . - . . . . : , , ( ) , :<br>[07.26 15:29:28] chrome.exe - client.github.user.content.com:443 close, 335 bytes sent, 4369 bytes (426 KB) received, lifetime 03:15 |
| T13 | [ . : : ] . - . . . . : , , ( ) , :<br>[07.26 15:29:28] chrome.exe - client.github.user.content.com:443 close, 335 bytes sent, 4369 bytes (426 KB) received, lifetime 03:15 |
| T14 | [ . : : ] . - . . . . : , , ( ) , :<br>[07.26 15:29:28] chrome.exe - client.github.user.content.com:443 close, 335 bytes sent, 4369 bytes (426 KB) received, lifetime 03:15 |
| T15 | [ . : : ] . - . . . . : , , ( . ) , :<br>[07.26 15:29:28] chrome.exe - client.github.user.content.com:443 close, 335 bytes sent, 4369 bytes (3.93 KB) received, lifetime 03:15 |
| T16 | [ . : : ] . - . . . . : , , ( . ) , :<br>[07.26 15:29:28] chrome.exe - client.github.user.content.com:443 close, 335 bytes sent, 4369 bytes (3.93 KB) received, lifetime 03:15 |
| T17 | [ . : : ] . - . . . . : , , ( . ) , :<br>[07.26 15:29:28] chrome.exe - client.github.user.content.com:443 close, 335 bytes sent, 4369 bytes (3.93 KB) received, lifetime 03:15 |
| T18 | [ . : : ] . - . . . . : , , ( . ) , :<br>[07.26 15:29:28] chrome.exe - client.github.user.content.com:443 close, 335 bytes sent, 4369 bytes (3.93 KB) received, lifetime 03:15 |

In a third application example, the log messages L1-L23 of the first application example are clustered using different fingerprints of the log messages. In addition to extracting the punctuation characters from the log messages, it is checked whether the log messages contain at least one "sentence" comprising at least two "words", wherein a word comprises a set of either small characters a-z (ASCII 97-112) or capital characters A-Z (ASCII 65-90) or combinations thereof. Each word needs to have a length of at least 2 characters. In order to make up a sentence, a word needs to be immediately followed by another word, and the sentence needs to be arranged between two immediately subsequent punctuation characters. By extracting not just the punctuation characters but also part of the log message into the fingerprint, more information from the log message is contained in a still very compact fingerprint. By doing so, the quality of the clustering can be improved further, and/or the number of clusters can be reduced.

How the fingerprinting works in practice is shown for two examples, namely for log message line L1 and log message line 19.

The fingerprint of the first line L1 of the list of log messages is F1="[.::].*---..:,bytsen,(.),:", see visual demonstration below. As in the first application example above, in a first step of forming the fingerprint, the punctuation symbols contained in the log message are extracted (in L1* the punctuation symbols are printed underlined and bold and an extra space before and after each of them was introduced).

| | |
|---|---|
| L1 | [07.26 14:14:18] chrome.exe *64 - f-log-extension.grammarly.io:443 close, 849 bytes sent, 3626 bytes (3.54 KB) received, lifetime 01:01 |
| | [ 07 . 26 14 : 14 : 18 ] chrome . exe * 64 - f - log - extension . Grammarly . io ( 443 close , 849 bytes sent , |
| L1* | 3626 bytes ( 3 . 54 KB ) received , lifetime 01 : 01 |
| | [07.26 14:14:18]chrome.exe *64 - f-log- |
| | extension.grammarly.io: 443 close, 849 bytes sent, 3626 bytes (3.54 KB) received, lifetime 01:01 |
| F1 | [.::].*---..:,bytsen,(.),: |

Next it is checked, whether at least two words, each consisting of text characters only, are present between two punctuation characters. In this case, "bytes sent" is present, consisting of two words, namely "bytes" and "sent". On the one hand, this additional information shall be preserved somehow in the fingerprint. On the other hand, the fingerprint shall be as concise as possible. Therefore, the first N characters of each word (in the example, three characters of each word are used) are added to the fingerprint. Consequently, the fingerprint F1 of log message L1 is "[.::].*---..:,bytsen,(.),:". Instead of using the first N characters of the words, other possibilities, such as using the first, the middle and the last character of a word are possible too.

The fingerprint of the first line L19 of the list of log messages is F19="[.::]-.-. . . ::Counotconthrpropro. . . .:", see visual demonstration below. Analogous to the first application example above, in a first step of forming the fingerprint, the punctuation symbols contained in the log message are extracted (in L19* the punctuation symbols are printed bold and underlined and an extra space before and after each of them was introduced).

| | |
|---|---|
| L19 | [10.30 18:04:14] Skype-remote.exe - 86.99.222.235:443 error : Could not connect through proxy proxy.cse.cuhk.edu.hk:5070 |
| | [ 10 . 30 18 : 04 : 14 ] Skype - remote . exe - 86 . 99 . 222 . 235 : 443 error : Could not connect through proxy . |
| L19* | cse . cuhk . edu . hk : 5070 |
| F19 | [.::]-.-...::Counotconthrpropro....: |

Next it is checked, whether at least two words, each consisting of text characters only, are present between two punctuation characters. In this case, "Could not connect through proxy" is present, consisting of 6 words, namely "Could", . . . ,"proxy", and again "proxy". In order not to lose that additional information, the first N characters of each word (in the example, three characters are used) are added to the fingerprint. Consequently, the fingerprint F19 of log message L19 is "[.::]-.-. . . ::Counotconthrpropro. . . .:".

Therefore, the fingerprints F1-F23 for log lines L1-L23 are:

| | |
|---|---|
| F1 | [.::].*---..:,bytsen,(.),: |
| F2 | [.::].*---..:,bytsen,(.),: |
| F3 | [.::].*---..:,bytsen,(.),: |
| F4 | [.::].*--..:,bytsen,(.),: |
| F5 | [.::].*-...:,bytsen,(.),: |
| F6 | [.::].*-...:,bytsen,(.),: |
| F7 | [.::]-***-.-....:,bytsen,(.),: |
| F8 | [.::].*-...:,bytsen,(.),< |
| F9 | [.::].*-...:,bytsen,(.),: |
| F10 | [.::].--...:,bytsen,(.),: |
| F11 | [.::]-.-..:,bytsen,( ),< |
| F12 | [.::]-.....:,bytsen,( ),: |
| F13 | [.::]-.....:,bytsen,( ),: |
| F14 | [.::]-.....:,bytsen,( ),: |
| F15 | [.::]-.....:,bytsen,(.),: |

-continued

| | |
|---|---|
| F16 | [.::].-.....:,bytsen,(.),: |
| F17 | [.::].-.....:,bytsen,(.),: |
| F18 | [.::].-.....:,bytsen,(.),: |
| F19 | [.::]-.-....::Counotconthrpropro....: |
| F20 | [.::]-.-....::Counotconthrpropro....: |
| F21 | [.::]-.-....::Counotconthrpropro....: |
| F22 | [.::]-.-....::Counotconthrpropro....: |
| F23 | [.::]-.-....::Counotconthrpropro....: |

In the next step, the fingerprints are sorted lexicographically, e.g. according to their ASCII values. The sorting results in the following order:

| | |
|---|---|
| F7 | [.::]-***-.-.....:,bytsen,(.),: |
| F19 | [.::]-.-....::Counotconthrpropro....: |
| F20 | [.::]-.-....::Counotconthrpropro....: |
| F21 | [.::]-.-....::Counotconthrpropro....: |
| F22 | [.::]-.-....::Counotconthrpropro....: |
| F23 | [.::]-.-....::Counotconthrpropro....: |
| F1 | [.::].*---..:,bytsen,(.),: |
| F2 | [.::].*---..:,bytsen,(.),: |
| F3 | [.::].*---..:,bytsen,(.),: |
| F4 | [.::].*--..:,bytsen,(.),: |
| F5 | [.::].*-...:,bytsen,(.),: |
| F6 | [.::].*-...:,bytsen,(.),: |
| F8 | [.::].*-...:,bytsen,(.),< |
| F9 | [.::].*-..:,bytsen,(.),: |
| F10 | [.::].--..:,bytsen,(.),: |
| F11 | [.::].-.-..:,bytsen,( ),< |
| F12 | [.::].-.....:,bytsen,( ),: |
| F13 | [.::].-.....:,bytsen,( ),: |
| F14 | [.::].-.....:,bytsen,( ),: |
| F15 | [.::].-.....:,bytsen,(.),: |
| F16 | [.::].-.....:,bytsen,(.),: |
| F17 | [.::].-.....:,bytsen,(.),: |
| F18 | [.::].-.....:,bytsen,(.),: |

In the next step, pre-clustering of the fingerprints is performed, i.e. identical fingerprints are merged into corresponding clusters. This results in the following 11 clusters:

| | |
|---|---|
| Cluster 1 | |
| F7 | [.::]-***-.-.....:,bytsen,(.),: |
| Cluster 2 | |
| F19 | [.::]-.-....::Counotconthrpropro....: |
| F20 | [.::]-.-....::Counotconthrpropro....: |
| F21 | [.::]-.-....::Counotconthrpropro....: |
| F22 | [.::]-.-....::Counotconthrpropro....: |
| F23 | [.::]-.-....::Counotconthrpropro....: |
| Cluster 3 | |
| F1 | [.::].*---..:,bytsen,(.),: |
| F2 | [.::].*---..:,bytsen,(.),: |
| F3 | [.::].*---..:,bytsen,(.),: |
| Cluster 4 | |
| F3 | [.::].*--..:,bytsen,(.),: |
| Cluster 5 | |
| F5 | [.::].*-...:,bytsen,(.),: |
| F6 | [.::].*-...:,bytsen,(.),: |
| Cluster 6 | |
| F8 | [.::].*-...:,bytsen,(.),< |
| Cluster 7 | |
| F9 | [.::].*-..:,bytsen,(.),: |
| Cluster 8 | |
| F10 | [.::].--..:,bytsen,(.),: |
| Cluster 9 | |
| F11 | [.::].-.-..:,bytsen,( ),< |
| Cluster 10 | |
| F12 | [.::].-.....:,bytsen,( ),: |
| F13 | [.::].-.....:,bytsen,( ),: |
| F14 | [.::].-.....:,bytsen,( ),: |
| Cluster 11 | |
| F15 | [.::].-.....:,bytsen,(.),: |
| F16 | [.::].-.....:,bytsen,(.),: |
| F17 | [.::].-.....:,bytsen,(.),: |
| F18 | [.::].-.....:,bytsen,(.),: |

The clusters may be written more compact as:

| | |
|---|---|
| Cluster 1 | |
| F7 | [.::]-***-.-.....:,bytsen,(.),: |
| Cluster 2 | |
| F19, F20, F21, F22, F23 | [.::] -. -.....::Counotconthrpropro....: |
| Cluster 3 | |
| F1, F2, F3 | [.::].*---..:,bytsen,(.),: |
| Cluster 4 | |
| F4 | [.::].*--..:,bytsen,(.),: |
| Cluster 5 | |
| F5, F6 | [.::].*-...:,bytsen,(.),: |
| Cluster 6 | |
| F8 | [.::].*-...:,bytsen,(.),< |
| Cluster 7 | |
| F9 | [.::].*-..:,bytsen,(.),: |
| Cluster 8 | |
| F10 | [.::].--..:,bytsen,(.),: |
| Cluster 9 | |
| F11 | [.::].-.-..:,bytsen,( ),< |
| Cluster 10 | |
| F12, F13, F14 | [.::].-.....:,bytsen,( ),: |
| Cluster 11 | |
| F15, F16, F17, F18 | [.::].-.....:,bytsen,(.),: |

Next, it is checked whether a cluster can be merged with three subsequent clusters. First, it is tried whether clusters 1 and 2 are similar enough to be clustered into one cluster. Therefore, NED(F7, F19) is calculated. In order to make this more computationally efficient, the common leading portion and—if present—the common trailing portion of the fingerprint strings are removed. As both F7 and F19 have the same leading portion "[.::]-" and the same trailing portion ":", the common leading and trailing portions are removed. The shortened fingerprint for F7, called F7*, is F7*="***-.-. . . .:,bytsen,(.),". The shortened fingerprint for F19, called F19*, is F19*=".-. . . ::Counotconthrpropro. . . .". Note that the edit distance for fingerprints F7 and F19=24 and is equal to the edit distance for fingerprints F7* and F19*. However, as the length of the reduced strings are much shorter (e.g. F19=36 and the length of F19*=29), the normalized edit distance (here called NED) can be vastly different if no compensation for the shorted fingerprint strings is made. In order to remove potential sources of error, it is proposed to calculate NED as follows:

$$NED(F1, F2) = \frac{\text{edit distance }(F1^*, F2^*)}{\max[\text{length}(F1), \text{length}(F2)]},$$

where F1' and F2' are the shortened fingerprints and F1, F2 are the fingerprints before shortening.

In any case, NED(F7, F19)>the similarity threshold of 0.3, therefore clusters 1 and 2 will not be combined. However, as NED(F7, F1) and NED(F7, F4) are both<0.30, these clusters will be combined with cluster 1. This results in the following clusters:

| | |
|---|---|
| Cluster 1 | |
| F7 | [.::]-***-.-.....:,bytsen,(.),: |
| F1, F2, F3 | [.::].*---..:,bytsen,(.),: |
| F4 | [.::].*--..:,bytsen,(.),: |
| Cluster 2 | |
| F19, F20, F21, F22, F23 | [.::]-.-....::Counotconthrpropro....: |

-continued

| | |
|---|---|
| Cluster 3 | |
| F5, F6 | [.::].*-....:,bytsen,(.),: |
| Cluster 4 | |
| F8 | [.::].*-....:,bytsen,(.),< |
| Cluster 5 | |
| F9 | [.::].*-..:,bytsen,(.),: |
| Cluster 6 | |
| F10 | [.::].--..:,bytsen,(.),: |
| Cluster 7 | |
| F11 | [.::].-.-..:,bytsen,( ),< |
| Cluster 8 | |
| F12, F13, F14 | [.::].-.....:,bytsen,( ),: |
| Cluster 9 | |
| F15, F16, F17, F18 | [.::].-....:,bytsen,(.),: |

Next, it is tried whether cluster 2 can be combined with three subsequent clusters, namely cluster 3, 4 and 5. As NED(F19,F5)>0.3, NED(F19,F8)>0.3 and NED(F19, F9)>0.3, all these clusters remain separate.

Next, it is examined whether cluster 3 can be combined with three subsequent clusters, namely clusters 4, 5 and 6. As NED(F5,F8)≤0.3, NED(F5,F9)≤0.3 and NED(F5,F10) ≤0.3, all these clusters will be combined with cluster 3. Therefore, the following clusters are present:

| | |
|---|---|
| Cluster 1 | |
| F7 | [.::]-***-.-....:,bytsen,(.),: |
| F1, F2, F3 | [.::].*---..:,bytsen,(.),: |
| F4 | [.::].*--..:,bytsen,(.),: |
| Cluster 2 | |
| F19, F20, F21, F22, F23 | [.::]-.-....::Counotconthrpropro....: |
| Cluster 3 | |
| F5, F6 | [.::].*-....:,bytsen,(.),: |
| F8 | [.::].*-....:,bytsen,(.),< |
| F9 | [.::].*-..:,bytsen,(.),: |
| F10 | [.::].--..:,bytsen,(.),: |
| Cluster 4 | |
| F11 | [.::].-.-..:,bytsen,( ),< |
| Cluster 5 | |
| F12, F13, F14 | [.::].-.....:,bytsen,( ),: |
| Cluster 6 | |
| F15, F16, F17, F18 | [.::].-....:,bytsen,(.),: |

Next, it is examined whether cluster 4 can be combined with three subsequent clusters, namely clusters 5 and 6. Please note that only two subsequent clusters are left after cluster 4. As NED(F11,F12)≤0.3 and NED(F11, F15)≤0.3, all these clusters will be combined with cluster 4. Therefore, the following clusters are present:

| | |
|---|---|
| Cluster 1 | |
| F7 | [.::]-***-.-....:,bytsen,(.),: |
| F1, F2, F3 | [.::].*---..:,bytsen,(.),: |
| F4 | [.::].*--..:,bytsen,(.),: |
| Cluster 2 | |
| F19, F20, F21, F22, F23 | [.::]-.-....::Counotconthrpropro....: |
| Cluster 3 | |
| F5, F6 | [.::].*-....:,bytsen,(.),: |
| F8 | [.::].*-....:,bytsen,(.),< |
| F9 | [.::].*-..:,bytsen,(.),: |
| F10 | [.::].--..:,bytsen,(.),: |
| Cluster 4 | |
| F11 | [.::].-.-..:,bytsen,( ),< |
| F12, F13, F14 | [.::].-.....:,bytsen,( ),: |
| F15, F16, F17, F18 | [.::].-....:,bytsen,(.),: |

In the 1$^{st}$ pass of clustering, 11 clusters were reduced to 4 clusters. As an additional optional step, a 2$^{nd}$ pass of clustering will be performed. It will be examined whether up to 6 subsequent clusters can be merged with a cluster. In our case, it will be examined whether cluster 1 can be combined with cluster 2, 3 or 4. Therefore, NED(F7, F19), NED(F7, F5) and NED(F7,F11) will be calculated. Note that as NED(F7, F19) was calculated earlier, the result can be looked up in a hash table or generally a lookup table, as described above. As NED(F7,F19)>0.3 and both NED(F7, F5) and NED(F7, F11)≤0.3, clusters 3 and 4 will be combined with cluster 1. Cluster 2 remains separate.

After the 2$^{nd}$ pass of clustering, the following clusters are present:

| | |
|---|---|
| Cluster 1 | |
| F7 | [.::]-***-.-....:,bytsen,(.),: |
| F1,F2,F3 | [.::].*---..:,bytsen,(.),: |
| F4 | [.::].*--..:,bytsen,(.),: |
| F5,F6 | [.::].*-....:,bytsen,(.),: |
| F8 | [.::].*-....:,bytsen,(.),< |
| F9 | [.::].*-..:,bytsen,(.),: |
| F10 | [.::].--..:,bytsen,(.),: |
| F11 | [.::].-.-..:,bytsen,( ),< |
| F12,F13,F14 | [.::].-.....:,bytsen,( ),: |
| F15,F16,F17,F18 | [.::].-....:,bytsen,(.),: |
| Cluster 2 | |
| F19,F20,F21,F22,F23 | [.::]-.-....::Counotconthrpropro....: |

Please note that the order of messages or fingerprints in a cluster is irrelevant, therefore cluster 1 comprises the fingerprints F1-F18 (and hence also the log messages L1-L18) and cluster 2 comprises the fingerprints F19-F23 (and hence also the log messages L19-L23). As final result, the following log messages will be clustered into the following clusters (see also FIG. 9):

| | |
|---|---|
| Cluster 1 | |
| L1 | [07.26 14:14:18] chrome.exe *64 - f-log-extension.grammarly.io:443 close, 849 bytes sent, 3626 bytes (3.54 KB) received, lifetime 01:01 |
| L2 | [07.26 15:25:19] chrome.exe *64 - zhihu-web-analytics.zhihu.com:443 close, 343 bytes sent, 3122 bytes (3.04 KB) received, lifetime 00:11 |
| L3 | [07.26 15:25:19] chrome.exe *64 - zhihu-web-analytics.zhihu.com:443 close, 343 bytes sent, 3122 bytes (3.04 KB) received, lifetime 00:11 |
| L4 | [07.26 16:27:39] chrome.exe *64 - hkg3-2.fbcdn.net: 443 close, 339 bytes sent, 3826 bytes (3.73 KB) received, lifetime 00:21 |
| L5 | [07.26 15:29:26] chrome.exe *64 - user.images.githubusercontent.com:443 close, 335 bytes sent, 4369 bytes (4.26 KB) received, lifetime 03:15 |
| L6 | [07.26 15:29:27] chrome.exe *64 - user.images.githubusercontent.com:443 close, 335 bytes sent, 4369 bytes (4.26 KB) received, lifetime 03:15 |
| L7 | [07.26 15:29:27] chrome-remote *64 *32 *128 - user.images-remote.github.user.content.com:443 close, 335 bytes sent, 4369 bytes (4.26 KB) received, lifetime 03:15 |
| L8 | [07.26 15:29:31] chrome.exe *64 - 12.client.google.com:443 close, 474 bytes sent, 4042 bytes (3.94 KB) received, lifetime <1 sec |
| L9 | [07.26 15:29:27] chrome.exe *64 - github.usercontent.com:443 close, 335 bytes sent, 4369 bytes (4.26 KB) received, lifetime 03:15 [07.26 15:29:28] chrome.exe - remote-user.content.com:443 close, 335 |

-continued

| | |
|---|---|
| L10 | bytes sent, 4369 bytes (4.26 KB) received, lifetime 03:15 |
| | [07.26 15:29:28] chrome.exe - 15.user-remote.content.com:443 close, |
| L11 | 335 bytes sent, 4369 bytes (426 KB) received, lifetime <1 sec |
| | [07.26 15:29:28] chrome.exe - client.github.user.content.com:443 |
| L12 | close, 335 bytes sent, 4369 bytes (426 KB) received, lifetime 03:15 |
| | [07.26 15:29:28] chrome.exe - client.github.user.content.com:443 |
| L13 | close, 335 bytes sent, 4369 bytes (426 KB) received, lifetime 03:15 |
| | [07.26 15:29:28] chrome.exe - client.github.user.content.com:443 |
| L14 | close, 335 bytes sent, 4369 bytes (426 KB) received, lifetime 03:15 |
| | [07.26 15:29:28] chrome.exe - client.github.user.content.com:443 |
| L15 | close, 335 bytes sent, 4369 bytes (3.93 KB) received, lifetime 03:15 |
| | [07.26 15:29:28] chrome.exe - client.github.user.content.com:443 |
| L16 | close, 335 bytes sent, 4369 bytes (3.93 KB) received, lifetime 03:15 |
| | [07.26 15:29:28] chrome.exe - client.github.user.content.com:443 |
| L17 | close, 335 bytes sent, 4369 bytes (3.93 KB) received, lifetime 03:15 |
| | [07.26 15:29:28] chrome.exe - client.github.user.content.com:443 |
| L18 | close, 335 bytes sent, 4369 bytes (3.93 KB) received, lifetime 03:15 |
| Cluster 2 | |
| L19 | [10.30 18:04:14] Skype-remote.exe - 86.99.222.235:443 error : Could not connect through proxy proxy.cse.cuhk.edu.hk:5070 |
| L20 | [10.30 18:04:15] Skype-remote.exe - 86.99.222.235:443 error : Could not connect through proxy proxy.cse.cuhk.edu.hk:5070 |
| L21 | [10.30 18:04:15] Skype-remote.exe - 86.99.222.235:443 error : Could not connect through proxy proxy.cse.cuhk.edu.hk:5070 |
| L22 | [10.30 18:04:16] Skype-remote.exe - 86.99.222.235:443 error : Could not connect through proxy proxy.cse.cuhk.edu.hk:5070 |
| L23 | [10.30 18:04:16] Skype-remote.exe - 86.99.222.235:443 error : Could not connect through proxy proxy.cse.cuhk.edu.hk:5070 |

Please note that instead or even in addition to adding multiple "words" making up a "sentence" between two punctuation characters in a log message to the fingerprint, it is also possible to add even a single "word", e.g. a word out of a list of keywords, such as "warning", "debug", "error", "info" to the fingerprint, since the keywords may be considered to contain important information about the log message. For example, the log message L19 of the application examples reads "[10.30 18:04:14] Skype-remote.exe— 86.99.222.235:443 error: Could not connect through proxy proxy.cse.cuhk.edu.hk: 5070". The fingerprint of this log message considering only punctuation characters reads "[.::]-.-. . . ::. . . . .:" (see $1^{st}$ or $2^{nd}$ application example). The fingerprint of this log message considering punctuation characters and at least one sentence consisting of multiple words between two punctuation characters reads "[.::]-.-. . . ::Counotconthrpropro. . . :" (see $3^{rd}$ application example). If in addition keywords, such as "error", "debug", "info" . . . , are considered, the fingerprint for L19 becomes "[.::]-.-. . . :err:Counotconthrpropro. . . .:" although only one word, namely "error", is present between two subsequent punctuation characters. However, as the word "error" is contained in a list of freely definable keywords, the word is added to the fingerprint in shortened form, here by taking the first three characters of the word. As noted above, it would also be possible to add keywords instead of adding a sentence consisting of multiple words to the fingerprint. In the example given above, the fingerprint for L19 would then be "[.::]-.-. . . :err:. . . .:". From the above it is evident, that the fingerprinting is very flexible and may be applied in multiple ways in order to cluster the log messages in to provide a lot of information in a compact way.

By looking at the clusters from the different application examples it is evident that the third application example results in 2 clusters, which corresponds to two possible original log events, whereas the first and the second example result in 3 clusters.

In addition to clustering a set of multiple log lines from scratch, i.e. where no clusters are present at the start of the process, the techniques described above can also be used to add a log line to a set of multiple clusters of log lines. This is described in the subsequent paragraphs and shown in FIG. 10.

Let us consider the log messages L1-L23 of Tab. 1 and the clustering into clusters 1 to 3 done in the $1^{st}$ application example. The fingerprint of the first log line in each cluster and the IDs of the log lines in the respective cluster are listed below:

TABLE 5

Original clusters

| Fingerprint | ID of log line(s) |
|---|---|
| [.::]-***-.-....:,(.),: | L7, L1-L6, L8-L10 |
| [.::]-.-....:...: | L19-L23 |
| [.::]-.-..:,( ),< | L11-L18 |

In FIG. 10, block 200 contains the list of fingerprints of the original clusters. Let us consider that a new log line LX shall be added to the cluster of log lines. By adding is meant that the new log line is either added to one of the existing clusters, or an additional cluster is added to the already existing clusters.

Let us assume the following log line LX:

TABLE 6

New log line LX

| ID | Log line |
|---|---|
| LX | [09.20 13:35:47] firefox.exe *64 - f-log-api.dynatrace.com:443 close, 1057 bytes sent, 4578 bytes (4.47 KB) received, lifetime 13:45 |

In step 210, the fingerprint for LX is generated applying the same fingerprinting technique as used when clustering the original log lines L1-L23 making up the clusters. Fingerprinting the log line LX yields the fingerprint FX:
ID Fingerprint
FX [.::].*---..:,,(.),:
Tab. 7 Fingerprint FX of log line LX Next, the fingerprint FX is added to the list of fingerprints representing the clusters (step 220). It does not matter where FX is added, so in this example FX is added at the bottom of the list of fingerprints (see below).

| Fingerprint | ID of log line(s) |
|---|---|
| [.::]-***-.-....:,,(.),: | L7, L1-L6, L8-L10 |
| [.::]-.-...:.....: | L19-L23 |
| [.::].-.-..:,,( ),< | L11-L18 |
| [.::].*---..:,,(.),: | LX |

In the next step, the above table is sorted lexicographically by fingerprints (step 230). This yields:

| Fingerprint | ID of log line(s) |
|---|---|
| [.::]-***-.-....:,,(.),: | L7, L1-L6, L8-L10 |
| [.::]-.-...:.....: | L19-L23 |
| [.::].*---..:,,(.),: | LX |
| [.::].-.-..:,,( ),< | L11-L18 |

Instead of adding FX to the list of fingerprints and sorting the list, it is also possible to add FX into a binary tree. In this case, adding a new fingerprint to the binary tree automatically results in a sorted tree. In addition, duplicate entries of the same fingerprint are avoided, thus rendering pre-clustering superfluous.

The sorted list of fingerprints is pre-clustered such that identical fingerprints form part of the same cluster (step 240). As there are no identical fingerprints, the list remains unchanged. The list of pre-clustered fingerprints (block 240) is thus:

TABLE 8

List of pre-clustered fingerprints

| Fingerprint | ID of log line(s) |
|---|---|
| [.::]-***-.-....:,,(.),: | L7, L1-L6, L8-L10 |
| [.::]-.-...:.....: | L19-L23 |
| [.::].*---..:,,(.),: | LX |
| [.::].-.-..:,,( ),< | L11-L18 |

Next, one or more clustering runs (steps 260 and 270 in FIG. 10) are performed on the list of pre-clustered fingerprints. In this example, it is checked whether the similarity between neighboring clusters is smaller or equal to a threshold value t. Specifically, it is checked whether NED(F7, F19)≤t, NED(F7, FX)≤t, and NED(F7, F11)≤t. As the normalized edit distance NED between F7 and FX≤t, LX is merged with the first cluster. This yields:

| Fingerprint | ID of log line(s) |
|---|---|
| [.::]-***-.-....:,,(.),: | L7, L1-L6, L8-L10, LX |
| [.::]-.-...:.....: | L19-L23 |
| [.::].-.-..:,,( ),< | L11-L18 |

As the fingerprint FX of the new log line LX was arranged below the log line L7 representing the 1$^{st}$ cluster, merging LX with the 1$^{st}$ cluster does not change the fingerprint L7 representing the 1$^{st}$ cluster. In other words, the 1$^{st}$ cluster is still represented by F7 (and not by FX). It is noted that the fingerprints representing the clusters after the addition of LX have not changed. Consequently, further similarity checks can be stopped as they will not have any effect.

Preferably, the fingerprinting technique, the similarity measure and the threshold t applied for checking the similarity between neighboring clusters are identical to the parameters used for clustering the log lines in the first place.

Therefore as final result (block 280), the new log line LX is added to the 1$^{st}$ cluster previously representing the log lines L7, L1-L6 and L8-L10 (L1-L10).

The above steps may also be used to find log lines, or in other words a cluster of log lines, that are similar to a particular log line, say LX. In this case, the particular log line, LX, is added to the existing clusters of log lines as demonstrated above. After performing the above steps, the log lines similar to LX are contained in the cluster comprising LX.

It is noted that the above steps can also be used to build up clusters in the first place. The method is particularly useful for creating clusters of similar log lines from a stream of log lines. This is demonstrated in the following example:

Let us consider the log messages L1-L7 of Tab. 1 and the fingerprints F1-F7 of Tab. 2. Assuming that the log lines arrive at the computer doing the clustering one by one, i.e. first L1, then L2 . . . , then L6 and finally L7.

Fingerprinting L1 yields the fingerprint F1. F1 is added to an empty list of fingerprints, which later on represent the clusters. This yields:

| Fingerprint | Log lines |
|---|---|
| [.::].*---..:,,(.),: | L1 |

Next, the log line L2 arrives at the computer and fingerprinting L2 yields F2. The fingerprint F2 is added to the list of fingerprints, yielding:

| Fingerprint | Log lines |
|---|---|
| [.::].*---..:,,(.),: | L1 |
| [.::].*---..:,,(.),: | L2 |

Next, the above table is sorted by fingerprints. However, this has no effect. In the next step, pre-clustering of log lines is performed, i.e. log lines having identical fingerprints are added to clusters. This yields:

| Fingerprint | Log lines |
|---|---|
| [.::].*---..:,,(.),: | L1, L2 |

Next, the log line L3 arrives at the computer and fingerprinting L3 yields F3. F3 is added to the cluster of fingerprints, yielding:

| Fingerprint | Log lines |
|---|---|
| [.::].*---..:,,(.),: | L1, L2 |
| [.::].*---..:,,(.),: | L3 |

Next, the above table is sorted by fingerprints. However, this has no effect. In the next step, pre-clustering of log lines is performed, i.e. log lines having identical fingerprints are added to clusters. This yields:

| Fingerprint | Log lines |
| --- | --- |
| [.::].*---..:,,(.),: | L1, L2, L3 |

Next, the log line L4 arrives at the computer and fingerprinting L4 yields F4. F4 is added to the cluster of fingerprints, yielding:

| Fingerprint | Log lines |
| --- | --- |
| [.::].*---..:,,(.),: | L1, L2, L3 |
| [.::].*--..:,,(.),: | L4 |

Next, the above table is sorted by fingerprints. However, this does not change the order of fingerprints. In the next step, pre-clustering of log lines is performed, i.e. log lines having identical fingerprints are added to clusters. As there are no identical fingerprints, this does not change the table. After pre-clustering, the similarity between the log line L1 representing the $1^{st}$ cluster and the log line L4 representing the $2^{nd}$ cluster is calculated, i.e. NED(F1,F4). It turns out NED=0.05. In this example it is assumed that the threshold t=0.25 such that if NED≤t, two clusters will be merged. Doing this yields:

| Fingerprint | Log lines |
| --- | --- |
| [.::].*---..:,,(.),: | L1, L2, L3, L4 |

Next, the log line L5 arrives at the computer and fingerprinting L5 yields F5. F5 is added to the cluster of fingerprints, yielding:

| Fingerprint | Log lines |
| --- | --- |
| [.::].*---..:,,(.),: | L1, L2, L3, L4 |
| [.::].*--..:,,(.),: | L5 |

Next, the above table is sorted by fingerprints. However, this does not change the order of fingerprints. Next, pre-clustering of log lines is performed, i.e. log lines having identical fingerprints are added to clusters. Also this does not change the table. After pre-clustering, the similarity between L1 and L5 is calculated, i.e. NED(F1,F5). As NED=0.1, the two clusters will be merged. Doing this yields:

| Fingerprint | Log lines |
| --- | --- |
| [.::].*---..:,,(.),: | L1, L2, L3, L4, L5 |

Next, the log line L6 arrives at the computer and fingerprinting L6 yields F6. F6 is added to the cluster of fingerprints, yielding:

| Fingerprint | Log lines |
| --- | --- |
| [.::].*---..:,,(.),: | L1, L2, L3, L4, L5 |
| [.::].*--..:,,(.),: | L6 |

Next, the above table is sorted by fingerprints. This does, however, not change the list of fingerprints. Next, pre-clustering of log lines is performed. Also this does not change the table. After pre-clustering, the similarity between L1 and L6 is calculated. As NED(F1,F6)=0.1, L6 is added to the $1^{st}$ cluster. Doing this yields:

| Fingerprint | Log lines |
| --- | --- |
| [.::].*---..:,,(.),: | L1, L2, L3, L4, L5, L6 |

Finally, log line L7 arrives at the computer and fingerprinting L7 yields F7. F7 is added to the cluster of fingerprints, yielding:

| Fingerprint | Log lines |
| --- | --- |
| [.::].*---..:,,(.),: | L1, L2, L3, L4, L5, L6 |
| [.::]-***-.-....:,,(.),: | L7 |

Next, the above table is sorted by fingerprints. This yields:

| Fingerprint | Log lines |
| --- | --- |
| [.::]-***-.-....:,,(.),: | L7 |
| [.::].*---..:,,(.),: | L1, L2, L3, L4, L5, L6 |

In the next step, pre-clustering of log lines is performed, i.e. log lines having identical fingerprints are added to clusters. This does not change the table. After pre-clustering, the similarity between L7 and L1 is calculated, i.e. NED(F7,F1). As NED=0.25, the cluster of L1-L6 is added to L7. However, as L7 is located above F1 in the list of sorted fingerprints, the cluster comprising log lines L1-L6 is added to L7 such that L7 represents the newly formed cluster. By doing so, the fingerprint representing a cluster is the fingerprint appearing first in a list of sorted fingerprints representing the log lines contained in the cluster. Doing this yields:

| Fingerprint | Log lines |
| --- | --- |
| [.::]-***-.-....:,,(.),: | L7, L1, L2, L3, L4, L5, L6 |

As shown above, the steps of fingerprinting, sorting clusters by fingerprints, pre-clustering the clusters and at least one clustering run merging similar clusters can be applied to create a cluster of similar log lines.

Instead of storing the fingerprints representing the clusters in a linear list, an intermediate data structure, such as a binary tree, can be used to hold the fingerprints. In case a new fingerprint is added to the structure, the step of sorting the linear list of fingerprints can be replaced by adding a fingerprint to the intermediate data structure. Doing so reduces the order of complexity from $O(n*\log n)$ in case of sorting to $O(\log n)$ in case of adding an entry to a binary tree. This is particularly beneficial when the clustering of log lines is based on log lines arriving at a clustering computer one by one. In the case of batch wise clustering of log lines, in-place array sorting is preferred over binary trees since less memory is required and performance is faster due to contiguous memory access.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for analyzing log messages, comprising:
   receiving, by a computer processor, a plurality of log message from a list of log messages;
   for each log message in the log messages, generating, by the computer processor, a fingerprint for the log message and appending the fingerprint to the log message, where the fingerprint is comprised of punctuation characters in the log message;
   sorting, by the computer processor, the log messages in the list of log messages according to the punctuation characters comprising a fingerprint for a given log message; and
   clustering, by the computer processor, log messages in the sorted list of log messages into a final set of clusters, where each cluster in the final set of clusters includes one or more log messages and the log messages in each cluster have fingerprints similar to other log messages in the cluster;
   wherein clustering the sorted list of log messages further comprises
   clustering log messages in the sorted list of log messages into a first set of clusters, where log messages in each cluster of the first set of clusters has identical fingerprints; and
   computing a similarity metric between a fingerprint from a given cluster of the first set of clusters and a fingerprint from each of one or more subsequent clusters in the first set of clusters, and combining log messages from a particular cluster in the one or more subsequent clusters into the given cluster when the similarity metric for the particular cluster is less than a similarity threshold.

2. The method of claim 1 wherein generating a fingerprint further comprises extracting keywords from the log message and adding the keywords to the fingerprint.

3. The method of claim 1 wherein the log messages are sorted according to ACSII values of the punctuation characters comprising the fingerprint.

4. The method further includes repeating the steps of claim 1 for each uncombined cluster in the first set of clusters to form a second set of clusters.

5. The method of claim 4 further comprises continuing clustering log messages in the second set of clusters until a stop condition is met, thereby creating the final set of clusters.

6. The method of claim 1 wherein the similarity metric is further defined as an edit distance.

7. The method of claim 1 wherein the similarity metric is further defined as Levenshtein distance.

8. The method of claim 1 wherein the similarity metric is further defined as a normalized edit distance, where the normalized edit distance is computed as an edit distance between a first and second fingerprint divided by a length of a fingerprint, where the length corresponds to longer of the first fingerprint or the second fingerprint.

9. The method of claim 1 further comprises, prior to the step of further clustering log messages, analyzing log messages in the first set of clusters and removing identical portions log message from each of the log messages in the first set of clusters.

10. The method of claim 9 wherein the similarity metric is further defined as a normalized edit distance, where the normalized edit distance is computed as an edit distance between a first fingerprint and a second fingerprint divided by a length of a fingerprint, where computation of edit distance using the first fingerprint and the second fingerprint after the removal of the identical portions and the length corresponds to longer of the first fingerprint or the second fingerprint before removal of the identical portions.

11. A computer-implemented method for analyzing log messages, comprising:
   receiving, by a computer processor, a plurality of log message from a list of log messages;
   a) for each log message in the log messages, generating, by the computer processor, a fingerprint for the log message and appending the fingerprint to the log message, where the fingerprint is comprised of punctuation characters in the log message;
   b) sorting, by the computer processor, the log messages in the list of log messages according to the punctuation characters comprising a fingerprint for a given log message;
   c) clustering, by the computer processor, log messages in the sorted list of log messages into a first set of clusters, where each cluster in the first set of clusters includes one or more log messages and the log messages in each cluster have identical fingerprints;
   d) computing a similarity metric between a fingerprint from a given cluster of the first set of clusters and a fingerprint from each of one or more subsequent clusters in the first set of clusters;
   e) combining log messages from a particular cluster in the one or more subsequent clusters into the given cluster when the similarity metric for the particular cluster is less than a similarity threshold similar to other log messages in the cluster;
   for each uncombined cluster in the first set of clusters, repeating steps d) and e), thereby forming a second set of clusters.

12. The method of claim 11 wherein the log messages are sorted according to ACSII values of the punctuation characters comprising the fingerprint.

13. The method of claim 11 wherein the similarity metric is further defined as an edit distance.

14. A non-transitory computer-readable medium having computer-executable instructions that, upon execution of the instructions by a processor of a computer, cause the computer to perform:
   receive a plurality of log message from a list of log messages;
   for each log message in the log messages, generate a fingerprint for the log message and appending the fingerprint to the log message, where the fingerprint is comprised of punctuation characters in the log message;
   sort the log messages in the list of log messages according to the punctuation characters comprising a fingerprint for a given log message; and
   cluster log messages in the sorted list of log messages into a final set of clusters, where each cluster in the final set of clusters includes one or more log messages and the log messages in each cluster have fingerprints similar to other log messages in the cluster;
   wherein clustering the sorted list of log messages further comprises
   cluster log messages in the sorted list of log messages into a first set of clusters, where log messages in each cluster of the first set of clusters has identical fingerprints;
   compute a similarity metric between a fingerprint from a given cluster of the first set of clusters and a fingerprint from each of one or more subsequent clusters in the first set of clusters, and combine log messages from a particular cluster in the one or more subsequent clusters into the given cluster when the similarity metric for the particular cluster is less than a similarity threshold.

15. The non-transitory computer-readable medium of claim 14 further performs to extract keywords from the log message and add the keywords to the fingerprint.

16. The non-transitory computer-readable medium of claim 14 wherein the log messages are sorted according to ACSII values of the punctuation characters comprising the fingerprint.

17. The non-transitory computer-readable medium further performs to repeat the steps of claim 14 for each uncombined cluster in the first set of clusters to form a second set of clusters.

18. The non-transitory computer-readable medium of claim 17 wherein the similarity metric is further defined as an edit distance.

19. The non-transitory computer-readable medium of claim 17 wherein the similarity metric is further defined as Levenshtein distance.

20. The non-transitory computer-readable medium of claim 17 wherein the similarity metric is further defined as a normalized edit distance, where the normalized edit distance is computed as an edit distance between a first and second fingerprint divided by a length of a fingerprint, where the length corresponds to longer of the first fingerprint or the second fingerprint.

21. The method of claim 1 further comprises
   receiving a new log message after the step of clustering;
   generating a fingerprint for the new log message and appending the fingerprint to the new log message;
   adding the new log message with the appended fingerprint to the final set of clusters;
   sorting the log messages in the final set of clusters according to the punctuation characters comprising a fingerprint for a given log message; and
   re-clustering log messages in the sorted final set of clusters, where each cluster in the re-clustered set of clusters includes one or more log messages and the log messages in each cluster have fingerprints similar to other log messages in the cluster.

22. The method of claim 21 wherein the step of adding the new log message to the final set of clusters and sorting the log messages in the final set of clusters is replaced with adding the new log message to a binary tree.

* * * * *